(12) United States Patent
Ahrenholz et al.

(10) Patent No.: US 10,999,154 B1
(45) Date of Patent: May 4, 2021

(54) RELAY NODE MANAGEMENT FOR OVERLAY NETWORKS

(71) Applicant: Tempered Networks, Inc., Seattle, WA (US)

(72) Inventors: Jeffrey Michael Ahrenholz, Mercer Island, WA (US); Dustin Orion Lundquist, Vashon, WA (US)

(73) Assignee: Tempered Networks, Inc., Seattle, WA (US)

( * ) Notice: Subject to any disclaimer, the term of this patent is extended or adjusted under 35 U.S.C. 154(b) by 0 days.

(21) Appl. No.: 17/079,248

(22) Filed: Oct. 23, 2020

(51) Int. Cl.
*H04L 12/24* (2006.01)
*H04L 12/26* (2006.01)
*H04L 12/715* (2013.01)

(52) U.S. Cl.
CPC .............. *H04L 41/12* (2013.01); *H04L 43/08* (2013.01); *H04L 45/64* (2013.01)

(58) Field of Classification Search
CPC combination set(s) only.
See application file for complete search history.

(56) References Cited

U.S. PATENT DOCUMENTS

| | | |
|---|---|---|
| 5,835,727 A | 11/1998 | Wong et al. |
| 6,158,010 A | 12/2000 | Moriconi et al. |
| 6,981,156 B1 | 12/2005 | Stern et al. |
| 7,209,956 B2 | 4/2007 | Mache |
| 7,324,533 B1 | 1/2008 | DeLiberato et al. |
| 7,373,660 B1 | 5/2008 | Guichard et al. |
| 7,395,349 B1 | 7/2008 | Szabo et al. |
| 7,796,593 B1 | 9/2010 | Ghosh et al. |
| 7,881,199 B2 | 2/2011 | Krstulich |
| 7,996,894 B1 | 8/2011 | Chen et al. |
| 8,224,971 B1 | 7/2012 | Miller et al. |
| 8,429,400 B2 | 4/2013 | Khalid et al. |
| 8,489,701 B2 | 7/2013 | Manion et al. |
| 8,607,301 B2 | 12/2013 | Carrasco |
| 8,630,183 B2 | 1/2014 | Miyata |
| 8,832,211 B1 | 9/2014 | Lebedev et al. |
| 8,886,827 B2 | 11/2014 | Goel et al. |
| 8,959,513 B1 | 2/2015 | Swaminathan |
| 9,264,522 B1 | 2/2016 | Reeves et al. |
| 9,774,586 B1 | 9/2017 | Roche et al. |

(Continued)

FOREIGN PATENT DOCUMENTS

| | | |
|---|---|---|
| WO | 2007038872 A1 | 4/2007 |
| WO | 2008039506 A2 | 4/2008 |

(Continued)

OTHER PUBLICATIONS

International Search Report and Written Opinion for International Patent Application No. PCT/US2014/023632 dated Jun. 23, 2014, pp. 1-15.

(Continued)

*Primary Examiner* — Xavier S Wong
(74) *Attorney, Agent, or Firm* — John W. Branch; Branch Partners PLLC

(57) ABSTRACT

Embodiments are directed to managing communication over networks. A gateway identifier (GID), a network address, source nodes, relays, or the like, may be determined based on an overlay network. Two or more relays may be ranked based on metrics associated with each relay such that a top ranked relay is designated as a preferred relay.

28 Claims, 18 Drawing Sheets

(56) References Cited

U.S. PATENT DOCUMENTS

| | | |
|---|---|---|
| 10,158,545 B1 | 12/2018 | Marrone et al. |
| 2002/0026532 A1 | 2/2002 | Maeda et al. |
| 2002/0073182 A1 | 6/2002 | Zakurdaev et al. |
| 2002/0143855 A1 | 10/2002 | Traversat et al. |
| 2003/0061479 A1 | 3/2003 | Kimura |
| 2003/0081620 A1 | 5/2003 | Danner et al. |
| 2003/0123436 A1 | 7/2003 | Joseph et al. |
| 2004/0024905 A1 | 2/2004 | Liao et al. |
| 2004/0143628 A1 | 7/2004 | Bradford et al. |
| 2004/0268121 A1 | 12/2004 | Shelest et al. |
| 2005/0014500 A1 | 1/2005 | Muhonen et al. |
| 2005/0052999 A1 | 3/2005 | Oliver et al. |
| 2005/0265355 A1 | 12/2005 | Havala et al. |
| 2006/0190458 A1 | 8/2006 | Mishina et al. |
| 2007/0019641 A1 | 1/2007 | Pai et al. |
| 2007/0081530 A1 | 4/2007 | Nomura et al. |
| 2007/0226781 A1 | 9/2007 | Chen et al. |
| 2007/0230352 A1 | 10/2007 | Kokku et al. |
| 2007/0258440 A1 | 11/2007 | Watanabe |
| 2008/0072282 A1 | 3/2008 | Willis et al. |
| 2008/0082823 A1 | 4/2008 | Starrett et al. |
| 2008/0151916 A1 | 6/2008 | Jetcheva et al. |
| 2008/0232360 A1 | 9/2008 | Mihaly et al. |
| 2008/0288614 A1 | 11/2008 | Gil et al. |
| 2008/0307519 A1 | 12/2008 | Curcio et al. |
| 2009/0010168 A1 | 1/2009 | Yurchenko et al. |
| 2009/0034738 A1 | 2/2009 | Starrett |
| 2009/0059906 A1 | 3/2009 | Cullen |
| 2009/0129374 A1 | 5/2009 | Yurchenko et al. |
| 2009/0210518 A1 | 8/2009 | Verma et al. |
| 2009/0210541 A1 | 8/2009 | Chandolu et al. |
| 2009/0310518 A1 | 12/2009 | Jayaram et al. |
| 2010/0014533 A1 | 1/2010 | Hirano et al. |
| 2010/0024026 A1 | 1/2010 | Ylonen et al. |
| 2010/0027442 A1 | 2/2010 | Chockler et al. |
| 2010/0042747 A1 | 2/2010 | Hascalovici et al. |
| 2010/0214959 A1 | 8/2010 | Kuehnel et al. |
| 2010/0218235 A1 | 8/2010 | Ganot |
| 2010/0254395 A1 | 10/2010 | Smith et al. |
| 2011/0016509 A1 | 1/2011 | Huang et al. |
| 2011/0035466 A1 | 2/2011 | Panigrahi |
| 2011/0090892 A1 | 4/2011 | Cooke |
| 2011/0103393 A1 | 5/2011 | Meier et al. |
| 2011/0141881 A1 | 6/2011 | Joshi et al. |
| 2012/0110203 A1 | 5/2012 | Ozawa |
| 2012/0163196 A1 | 6/2012 | Jansen et al. |
| 2012/0304243 A1 | 11/2012 | Li et al. |
| 2013/0018993 A1 | 1/2013 | Hui et al. |
| 2013/0046414 A1* | 2/2013 | Ree .................. H02J 3/1892 700/297 |
| 2013/0083725 A1 | 4/2013 | Mallya et al. |
| 2013/0198830 A1 | 8/2013 | Nemoto et al. |
| 2013/0254264 A1 | 9/2013 | Hankinson et al. |
| 2013/0283364 A1 | 10/2013 | Chang et al. |
| 2014/0026207 A1 | 1/2014 | Wang et al. |
| 2014/0133354 A1 | 5/2014 | Scharf et al. |
| 2014/0150070 A1 | 5/2014 | Peterson |
| 2014/0223507 A1 | 8/2014 | Xu |
| 2014/0282817 A1 | 9/2014 | Singer et al. |
| 2014/0282850 A1 | 9/2014 | Mattes et al. |
| 2014/0307744 A1 | 10/2014 | Dunbar et al. |
| 2014/0348131 A1 | 11/2014 | Duan et al. |
| 2015/0024677 A1 | 1/2015 | Gopal et al. |
| 2015/0046997 A1 | 2/2015 | Gupta et al. |
| 2015/0057766 A1 | 2/2015 | Ejiri et al. |
| 2015/0067033 A1 | 3/2015 | Martinsen et al. |
| 2015/0124823 A1 | 5/2015 | Pani et al. |
| 2015/0135259 A1 | 5/2015 | Ilyadis et al. |
| 2015/0281074 A1 | 10/2015 | Kubota |
| 2015/0365316 A1 | 12/2015 | Liao et al. |
| 2015/0372828 A1 | 12/2015 | Hao et al. |
| 2016/0028624 A1 | 1/2016 | Song et al. |
| 2016/0036861 A1 | 2/2016 | Mattes et al. |
| 2016/0149804 A1 | 5/2016 | Mirza |
| 2016/0255542 A1* | 9/2016 | Hughes .................. H04W 28/18 370/329 |
| 2016/0261641 A1 | 9/2016 | Mattes et al. |
| 2017/0019430 A1* | 1/2017 | Cohn .................. H04L 65/1036 |
| 2017/0238215 A1 | 8/2017 | Jin |
| 2017/0373936 A1 | 12/2017 | Hooda et al. |
| 2018/0083968 A1 | 3/2018 | Xu et al. |
| 2018/0124183 A1 | 5/2018 | Kozat et al. |
| 2018/0234459 A1 | 8/2018 | Kung et al. |
| 2019/0149401 A1 | 5/2019 | Ramachandran et al. |
| 2019/0394107 A1 | 12/2019 | Marrone et al. |
| 2020/0067341 A1* | 2/2020 | Glover .................. H02J 50/20 |

FOREIGN PATENT DOCUMENTS

| | | |
|---|---|---|
| WO | 2011159842 A2 | 12/2011 |
| WO | 2019246331 A1 | 12/2019 |

OTHER PUBLICATIONS

Asguard Networks, Inc., "SimpleConnectTM Product Information," Retrieved on Nov. 9, 2012, from http://www.asguardnetworks.com/product/, p. 1.

Asguard Networks, Inc., "Welcome to Asguard Networks," Retrieved on Oct. 23, 2012, from http://www.asguardnetworks.com/, p. 1.

Asguard Networks, Inc., "SimpleConnectTM Quick Start Documentation Guide," Revision 1, Dec. 13, 2012, pp. 1-18.

Henderson, T. et al., "HIP-based Virtual Private LAN Service (HIPLS)," Network Working Group, Internet-Draft, The Boeing Company, Nov. 6, 2012, pp. 1-16.

Asguard Networks, Inc., "Gray Matter Systems Announces Asguard Networks Partnership at 2012 Gray Matter Systems Training and User Group Meeting," Aug. 9, 2012, retrieved on Oct. 23, 2012, from http://www.asguardnetworks.com/news/, pp. 1-2.

Trusted Computing Group, Incorporated, "TCG Trusted Network Connect: IF-MAP Metadata for ICS Security," Specification Version 1.0, Revision 44, May 8, 2014, pp. 1-64.

Office Communication for U.S. Appl. No. 14/204,907 dated Jul. 10, 2015, pp. 1-20.

Aoyagi, S. et al., "ELA: A Fully Distributed VPN System Over Peer-to-Peer Network," Proceedings of the 2005 Symposium on Applications and the Internet, 2005, IEEE, Computer Society, pp. 1-4.

Benyamina, D. et al., "Wireless Mesh Networks Design—A Survey," IEEE Communications Survey & Tutorials, vol. 14, No. 2, Second Quarter 2012, pp. 299-310.

Office Communication for U.S. Appl. No. 14/740,053 dated Jul. 29, 2015, pp. 1-10.

International Search Report and Written Opinion for International Patent Application No. PCT/US2015/042993 dated Nov. 11, 2015, pp. 1-11.

Office Communication for U.S. Appl. No. 14/814,283 dated Nov. 30, 2015, pp. 1-8.

Office Communication for U.S. Appl. No. 14/204,907 dated Dec. 2, 2015, pp. 1-14.

Office Communication for U.S. Appl. No. 14/740,053 dated Jan. 21, 2016, pp. 1-18.

Office Communication for U.S. Appl. No. 14/204,907 dated Feb. 24, 2016, pp. 1-14.

Office Communication for U.S. Appl. No. 14/814,283 dated Jun. 3, 2016, pp. 1-10.

Office Communication for U.S. Appl. No. 15/083,214 dated Jul. 7, 2016, pp. 1-11.

Trusted Computing Group Architects Guide; ICS Security Using TNC Technology, Oct. 2013, pp. 1-6.

Office Communication for U.S. Appl. No. 15/156,254 dated Aug. 3, 2016, pp. 1-13.

Office Communication for U.S. Appl. No. 15/083,214 dated Oct. 25, 2016, pp. 1-11.

Office Communication for U.S. Appl. No. 15/201,063 dated Nov. 2, 2016, pp. 1-11.

Office Communication for U.S. Appl. No. 14/814,283 dated Nov. 21, 2016, pp. 1-10.

(56) References Cited

OTHER PUBLICATIONS

Office Communication for U.S. Appl. No. 15/156,254 dated Dec. 30, 2016, pp. 1-13.
Office Communication for U.S. Appl. No. 15/083,214 dated Jan. 9, 2017, pp. 1-6.
Office Communication for U.S. Appl. No. 15/083,214 dated Feb. 9, 2017, pp. 1-10.
Office Communication for U.S. Appl. No. 15/201,063 dated Apr. 21, 2017, pp. 1-14.
Office Communication for U.S. Appl. No. 15/156,254 dated May 5, 2017, pp. 1-13.
Office Communication for U.S. Appl. No. 14/814,283 dated Jun. 9, 2017, pp. 1-18.
Office Communication for U.S. Appl. No. 15/156,254 dated Oct. 19, 2017, pp. 1-13.
Lawton, G., "Machine-to-Machine Technology gears up for growth", 2004, IEEE Computer Society, pp. 12-15.
Office Communication for U.S. Appl. No. 15/670,925 dated Apr. 5, 2018, pp. 1-10.
Office Communication for U.S. Appl. No. 15/156,254 dated May 14, 2018, pp. 1-19.
Office Communication for U.S. Appl. No. 15/670,859 dated Jun. 29, 2018, pp. 1-10.
Office Communication for U.S. Appl. No. 15/924,148 dated Jun. 5, 2018, pp. 1-13.
Office Communication for U.S. Appl. No. 15/987,762 dated Sep. 12, 2018, pp. 1-13.
Office Communication for U.S. Appl. No. 15/994,760 dated Oct. 1, 2018, pp. 1-10.
Office Communication for U.S. Appl. No. 15/670,859 dated Nov. 26, 2018, pp. 1-11.
Office Communication for U.S. Appl. No. 14/814,283 dated Aug. 23, 2016, pp. 1-8.
Office Communication for U.S. Appl. No. 16/562,258 dated Oct. 22, 2019, pp. 1-5.
Office Communication for U.S. Appl. No. 16/267,166 dated Jan. 14, 2020, pp. 1-5.
Office Communication for U.S. Appl. No. 16/172,621 dated Mar. 17, 2020, pp. 1-7.
Office Communication for U.S. Appl. No. 16/221,145 dated Apr. 13, 2020, pp. 1-7.
Office Communication for U.S. Appl. No. 16/562,258 dated Apr. 7, 2020, pp. 1-10.
Office Communication for U.S. Appl. No. 16/172,621 dated Jul. 15, 2020, pp. 1-15.
Office Communication for U.S. Appl. No. 16/267,166 dated Jul. 22, 2020, pp. 1-8.
Office Communication for U.S. Appl. No. 16/562,258 dated Sep. 8, 2020, pp. 1-11.
Office Communication for U.S. Appl. No. 16/221,145 dated Sep. 10, 2020, pp. 1-11.
Office Communication for U.S. Appl. No. 16/913,114 dated Oct. 1, 2020, pp. 1-21.
Office Communication for U.S. Appl. No. 16/562,258 dated Nov. 20, 2020, pp. 1-5.
Office Communication for U.S. Appl. No. 16/221,145 dated Nov. 23, 2020, pp. 1-4.
Office Communication for U.S. Appl. No. 17/084,557 dated Dec. 16, 2020, pp. 1-23.

\* cited by examiner

RELAY NODE MANAGEMENT FOR OVERLAY NETWORKS

TECHNICAL FIELD

The present invention relates generally to network management, and more particularly, but not exclusively, to managing communication over a network in which host identity is distinct from its topological location on a network.

BACKGROUND

Typical network communication protocols, such as, Internet Protocol (IP) deliver network packets from a source host to a destination host based on an IP address. Traditionally, IP addresses have served a dual purpose as a host's identity and location. This has led to challenges securing the various hosts and networks in modern distributed networking environments.

For instance, network packets often include a source network address that may be used by the target host to address and route return packets. However, in some cases target hosts may use the source network address to determine the identity of the source host. In some cases, this dual use may cause networks or services to be vulnerable to man-in-the-middle attacks based on network packets that include false or spoofed network addresses. Other security challenges enabled in part by this dual role of network addresses may include denial of service attacks, replay attacks, or the like. Also, since modern computing environments often employ ephemeral and/or non-unique network addresses, using network address to provide host identity poses challenges, as modern hosts, e.g. cell phones, frequently change location on the network. In some cases, overlay networks may be employed to layer a logical network (the overlay network) on conventional underlay networks. While the overlay network can provide additional security or flexibility, the work of actually moving the network traffic from one endpoint to another requires the underlay network and one or more underlay network protocols. Thus, it is with respect to these and other considerations that these innovations are made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
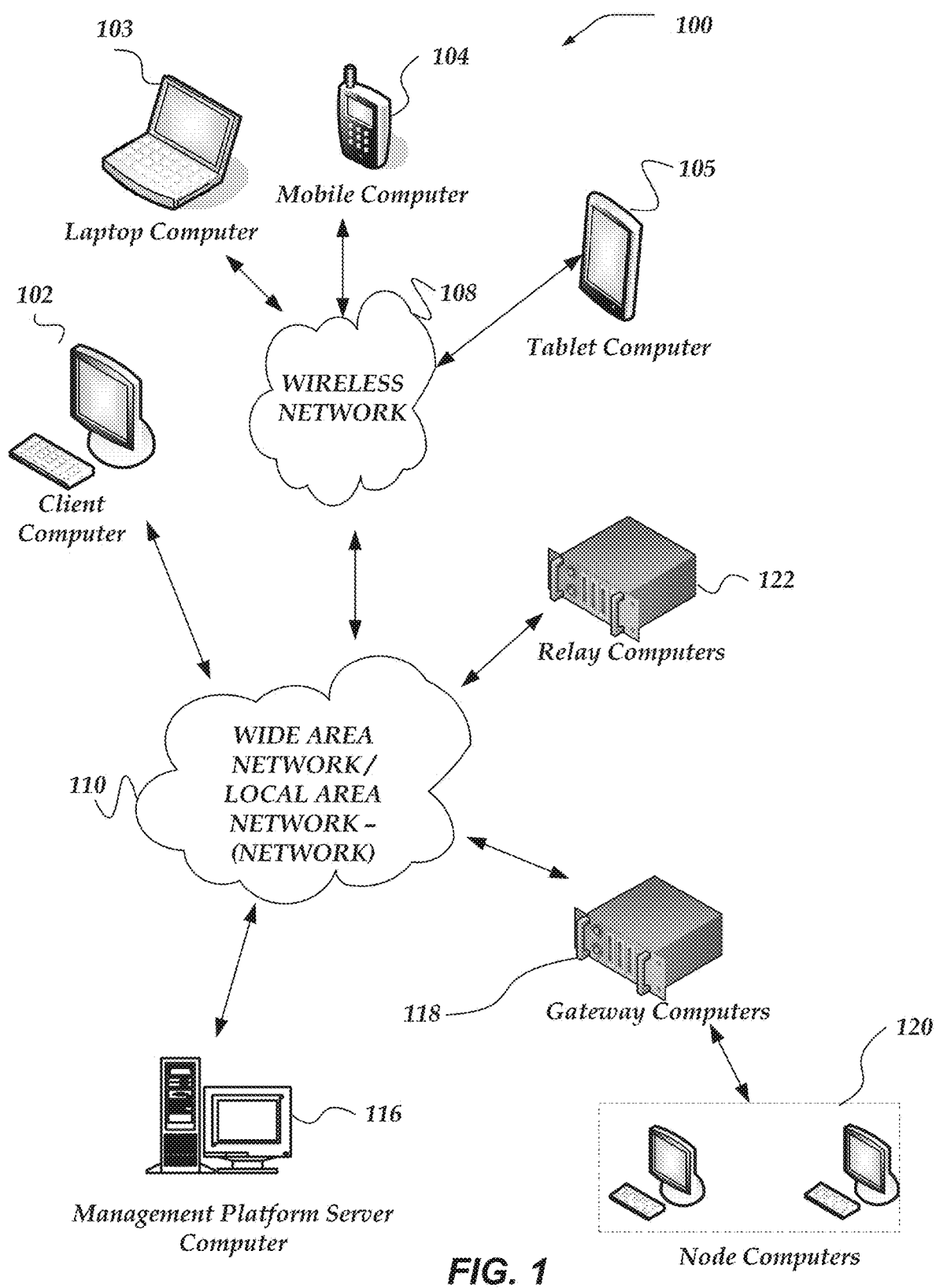
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the terms "overlay network," "mesh network," "industrial network" refer to a network of industrial computer/machines, workstations, client computers, gateway computers, or the like. The term mesh network used herein describes both the typical network topology of a network in an industrial operation environment as well as more generally, a networked system used to perform operations in an industrial environment, such as, as factory floor, manufacturing complex, oil refinery, or the like. In the interest of clarity such networks (including machines and computers on the network) are referred to as overlay networks even when their topology or configuration is not strictly a mesh network or partial mesh network.

As used herein the terms "physical network," "underlay network" refer to the actual communication networks that interconnect one or more computers or networks. The physical network may be a physical or native network device/components used to connect one or more computers or industrial devices (machines) in a network. Physical networks include network interfaces, wire, wireless hotspots, switches, routers, repeaters, or the like, that comprise the physical network Also, physical networks may be considered to include the native communication protocols, network topology, and so on, that may be used to setup a overlay network in an various environments. In some cases, physical networks may be arranged to enable open communication between node computers, (e.g., machines, workstations, client computers, and so on), gateway computers, management platform computers, relay computers, or the like, that are on the physical network.

As used herein the terms "node," and "node computer" refer to computers that are endpoint computers interconnected over a physical network. Node computers may include client computers, smart phones, video cameras, sensors, network computers, industrial workstations, press machines, robots, packaging machines, automated milling machines, automated printing presses, pumps, valves, boilers, or the like. Node computers are considered to be computers or devices connected to the physical network exclusive of gateway computers, relay computers, management platform server computers, or the like. Nodes gain access to the networks managed management platform via gateway computers As used herein the terms "source node," and "source node computer" refer to a node computer that is the originating endpoint of a network communication.

As used herein the terms "target node," and "target node computer" refer to a node computer that is the ultimate intended destination of a communication. In some embodiments, a source node computer may be communicating to one or more other node computers over an industrial/overlay network. These intended recipients of these communication may be considered target node computers. Accordingly, a node computer may be a target node computer if it receives communications and it may be a source node computer if it sends communications.

As used herein the terms "gateway," or "gateway computer" refer to computers connected to a network that are disposed between the node computers and the physical network. Gateway computers may be network computers that may be arranged to provide security, access control, communication routing, or the like, for overlay networks or mesh networks. In some embodiments, gateway computers may be configured by another network computer, such as, a management platform computer.

As used herein the terms "relay computer", "relay node," or "relay" refer to one or more computers that serve as intermediaries for establishing connections between gateway computers that may be on different networks. In some cases, relay computers may be associated with network addresses that may be reached from more than one network.

As used herein the term "network address" refers to a value or values used for locating an endpoint in a network. In some embodiments, endpoints may include services, networks, network computers, client computers, applications, firewall, router, load balancers, node computers, gateway computers, relay computers, management platform computers, or the like. A network address may be assumed to comprise one or more identifiers that may be recognized by one or more protocols.

As used herein the term "device address" refers to an identifier that may be associated with a network interface. Device addresses may be employed by low level network protocols to communicate network traffic from one network interface to another. Accordingly, devices addresses may be used to send network traffic from one device to another device that are in the same physical network segment. The particular makeup or format of a device address may vary depending on the network protocol being employed. For example, MAC addresses may be used to devices in Ethernet networks, Wifi networks, or Bluetooth networks. Device addresses may be unsuitable for communicating between devices on different networks or different network segments for various reasons including an absence of routing information or network topology information.

As used herein the term "protocol address" refers to an endpoint identifier that may be associated with devices or interfaces. Protocol addresses may be used to send network packets to other interfaces in the same network segment or to interfaces in other network segments depending on the network protocol and network policies/configuration. Protocol address generally embed information that may be employed to determine a communication path across one or more devices to reach a target or destination device. For example, IP addresses may be considered protocol addresses because devices on different networks that support the IP protocol may communicate with devices on the same network or different network. Protocol addresses assume that a network stack, network devices, or network engines may be enabled to associate protocol addresses with device addresses. This enables the lower level interface-to-interface communication to determine which interface receives the network traffic without knowledge of the higher level transport protocols that may be operative in a network. In cases where an interface is trying to reach another interface in a different network segment usually by stepping up to high level protocol that can negotiate the traversal across the network segments. Also, in some networking environments, one or more services may be provided that enable the discovery of which device address to employ to reach an interface associated with a given protocol address. In some cases, there may be one or more intervening networks that require traversal before the network that includes a target interface may be reached. Accordingly, routing services may provide device addresses that represent a 'next hop' on a path to the target device.

As used herein the term, "relay evaluation model" refers to one or more data structures that may be arranged to include one or more heuristics, machine learning classifiers, formulas, conditions, instructions, parameters, state machines, or the like, or combination thereof, that may be employed to determine how to determine one or more metrics associated with the performance or suitability of relay computers. Accordingly, relay evaluation models may define or execute one or more actions that may be performed to probe relay computers to determine the one or more performance metrics.

As used herein the term, "relay selection model" refers to one or more data structures that may be arranged to include one or more heuristics, machine learning classifiers, formulas, conditions, instructions, parameters, state machines, or the like, or combination thereof, that may be employed to determine how to select a relay computer that enable gateway computers to communicate with other gateway computers. Relay selection models may define criteria for selecting, sorting, or ranking the suitability of relay computers for relaying traffic between gateway computers.

As used herein the term "overlay traffic tunnel" refers to a network connection established through or over one or more underlay networks using a conventional network protocol that provides an overlay network connection between two gateway computers in the overlay network. The traffic in the overlay traffic tunnel is encrypted and opaque with respect to the underlay network.

As used herein the term "configuration information" refers to information that may include rule based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing communication over one or more networks. In one or more of the various embodiments, a gateway identifier (GID), a network address, one or more source nodes, two or more relays, or the like, may be determined based on an overlay network such that the GID may be based on the overlay network and the network address may be based on a first underlay network.

In one or more of the various embodiments, a target GID of a target gateway in a second underlay network may be determined based on the overlay network.

In one or more of the various embodiments, the two or more relays may be ranked based on one or more metrics associated with each relay such that a top ranked relay is designated as a preferred relay.

In one or more of the various embodiments, in response to a source node providing overlay traffic directed to a target node associated with the target GID: the first underlay network may be employed to provide network traffic that includes the overlay traffic to the preferred relay such that the preferred relay determines a target network address in the second underlay network based on the target GID and such that the preferred relay employs the target network address to provide the network traffic to the target gateway and such that the target gateway provides the overlay traffic to the target node; one or more updated metrics associated with the two or more relays may be determined; the two or more relays may be re-ranked based on the one or more updated metrics; in response to another relay exceeding the rank of the preferred relay, the other relay may be designated as a new preferred relay such that the new preferred relay employs the second underlay network to provide the network traffic to the target gateway; or the like.

In one or more of the various embodiments, a relay evaluation model may be determined based on the overlay network. In some embodiments, one or more actions for determining the one or more metrics may be determined based on the relay evaluation model such that the one or more actions include one or more of pinging the two or more relays over the underlay network, measuring a latency value for the two or more relays, underlay network utilization of the one or more relays, processors load of the two or more relays, average number of underlay network connections to the two or more relays, average number of overlay traffic tunnels that are active in the two or more relays, geographic distance to the two or more relays, or the like.

In one or more of the various embodiments, employing the first underlay network to provide the network traffic that includes the overlay traffic to the preferred relay, may include: establishing an overlay traffic tunnel that encrypts the overlay traffic such that the overlay traffic is opaque to preferred relay; and extending the overlay traffic tunnel to the target gateway over the second underlay network such that the target gateway is enabled to decrypt the overlay traffic and forward it to the target node.

In one or more of the various embodiments, a first overlay traffic tunnel may be established to the preferred relay such that the first overlay tunnel may be terminated at the preferred relay and such that the overlay traffic may be provided to the preferred relay over the overlay traffic tunnel. In some embodiments, a second overlay traffic tunnel may be established from the preferred relay to the target gateway. And, in some embodiments, the preferred relay may be employed to inspect the overlay traffic provided by the first overlay traffic tunnel before forwarding the overlay traffic to the second overlay traffic tunnel.

In one or more of the various embodiments, ranking the two or more relays based on the one or more metrics associated with each relay may include: determining a relay selection model based on the overlay network; determining a preference score for the two or more relays based on the relay selection model, wherein the relay selection model performs one or more actions for ranking the two or more relays, including one or more of, weighting the one or more metrics, or disqualifying one or more relays based on the one or more metric exceeding threshold value; or the like.

In one or more of the various embodiments, a value of the GID that may be restricted to an upper bound value and a lower bound value such that the upper bound value and the lower bound value provide a namespace for a plurality of GIDs that may be in the same overlay network such that one or more GIDs values that may be outside of the upper bound value and the lower bound value may be associated with one or more different overlay networks.

In one or more of the various embodiments, two or more agents that are hosted on the two or more relays may be provided. And, in some embodiments, a portion of one or more metrics may be collected from the two or more agents such that the portion of the one or more metrics may include one or more of process count, memory load, number of users, number of active overlay traffic tunnels, or list of active applications.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)–(network) 110, wireless network 108, client computers 102-105, management platform server computer 116, gateway computers 118, node computers 120, relay computers 122, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like.

For example, client computers 102-105 may be configured to operate as a web server, client application, media player, mobile telephone, game console, desktop computer, or the like. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), JavaScript Object Notation (JSON), or the like, to display and send a message. In one embodiment, a user of the client computer may employ the browser application to perform various activities over a network (online). However, another application may also be used to perform various online activities.

Node computers 122 represent one or more client computer, network computer, or network devices, or the like, that may be arranged to access networks via a gateway computer. Each node computer may be associated with a gateway computer that enable network access to other node computers, gateway computers, or the like. Node computers 122 may be arranged to communicate with their associate gateway computer. Accordingly, in some embodiments, their gateway computer may route the node computer communication according to policy provided by a management platform server, such as, management platform server computer 116.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include overlay networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, management platform server computer 116, gateway computers 118, node computers 120, relay computers 122, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

Although FIG. 1 illustrates management platform server computer 116, gateway computers 118, node computers 120, or relay computers 122, each as a single computer, the innovations or embodiments are not so limited. For example, one or more functions of management platform server computer 116, gateway computers 118, node computers 120 or the like, may be distributed across one or more distinct network computers. Moreover, management platform server computer 116, gateway computers 118, node computers 120, relay computers 122, or the like, are not limited to a particular configuration such as the one shown in FIG. 1. Thus, in one or more embodiments, management platform server computer 116, gateway computers 118, node computers 120, relay computers 122, or the like, may be implemented using a plurality of network computers. In other embodiments, management platform server computer 116, gateway computers 118, node computers 120, relay computers 122, or the like, may operate as a plurality of network computers within a cluster architecture, a peer-to-peer architecture, or the like. Also, in some embodiments, one or more processors on one or more network computers may be arranged to perform one or more actions of management platform server computer 116, gateway computers 118, node computers 120, relay computers 122, or the like. Further, in at least one of the various embodiments, management platform server computer 116, gateway computers 118, node computers 120, relay computers 122, or the like, may be implemented using one or more cloud instances in one or more cloud computing environments. Likewise, in at least one of the various embodiments, management platform server computer 116, gateway computers 118, node computers 120, relay computers 122, or the like, may be implemented using one or more container instances in one or more container computers environments.

Illustrative Client Computer

Figure 2:
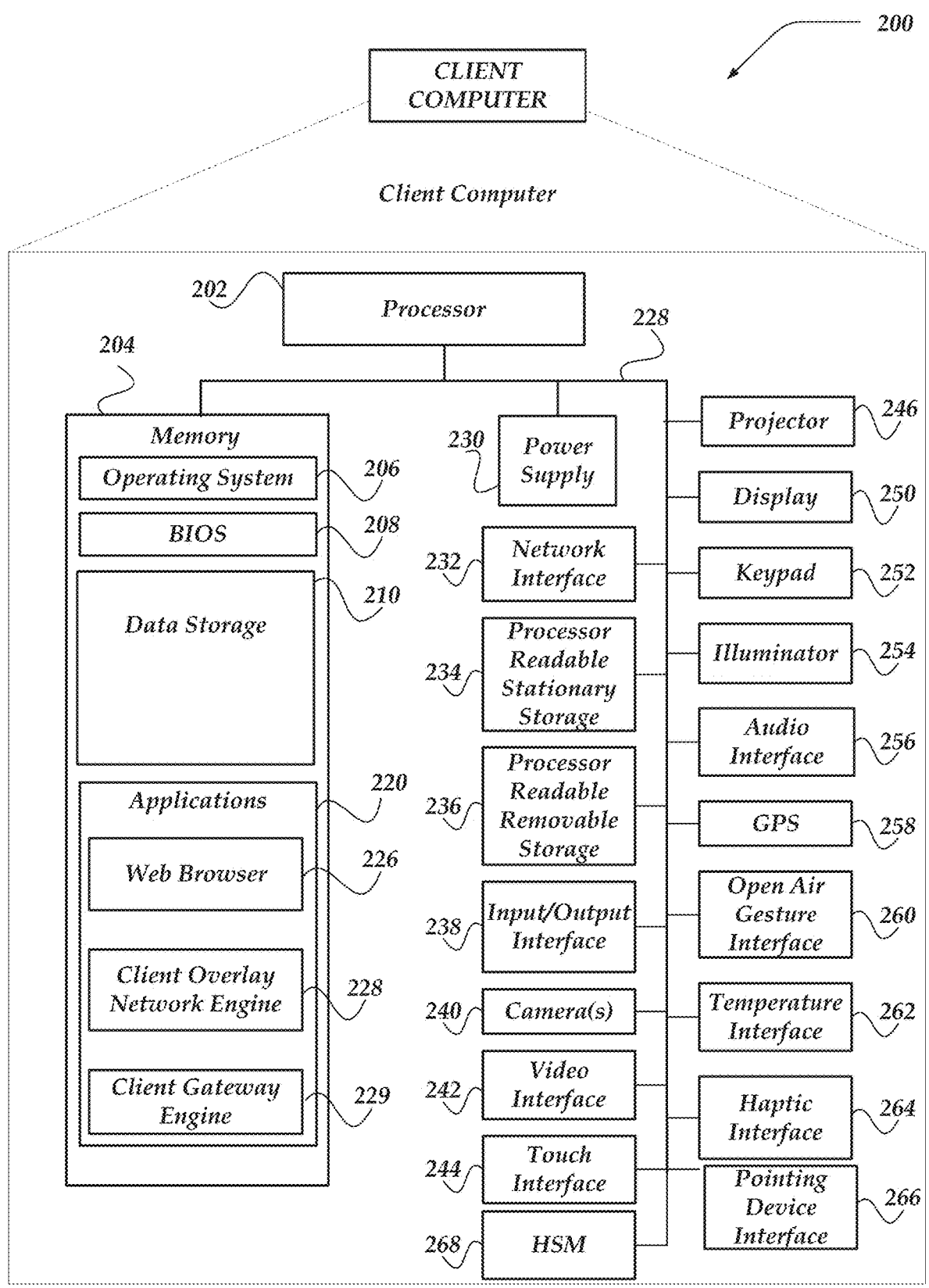
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers 102-105 shown in FIG. 1. Also, in some embodiments, one or more node computers, such as, node computers 120 may be client computers.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to events. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In at least one embodiment, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that may be configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like. Web browser 226 may be used to configure overlay routes via management platform server computer 116, as discussed below in conjunction with FIG. 3. For example, a user may operate web browser application 226 in order to configure one or more port level policies or port isolation policies for one or more node computers or gateway computers.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of events, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, web browser 226, client overlay engine 226, client gateway engine 229, or the like. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
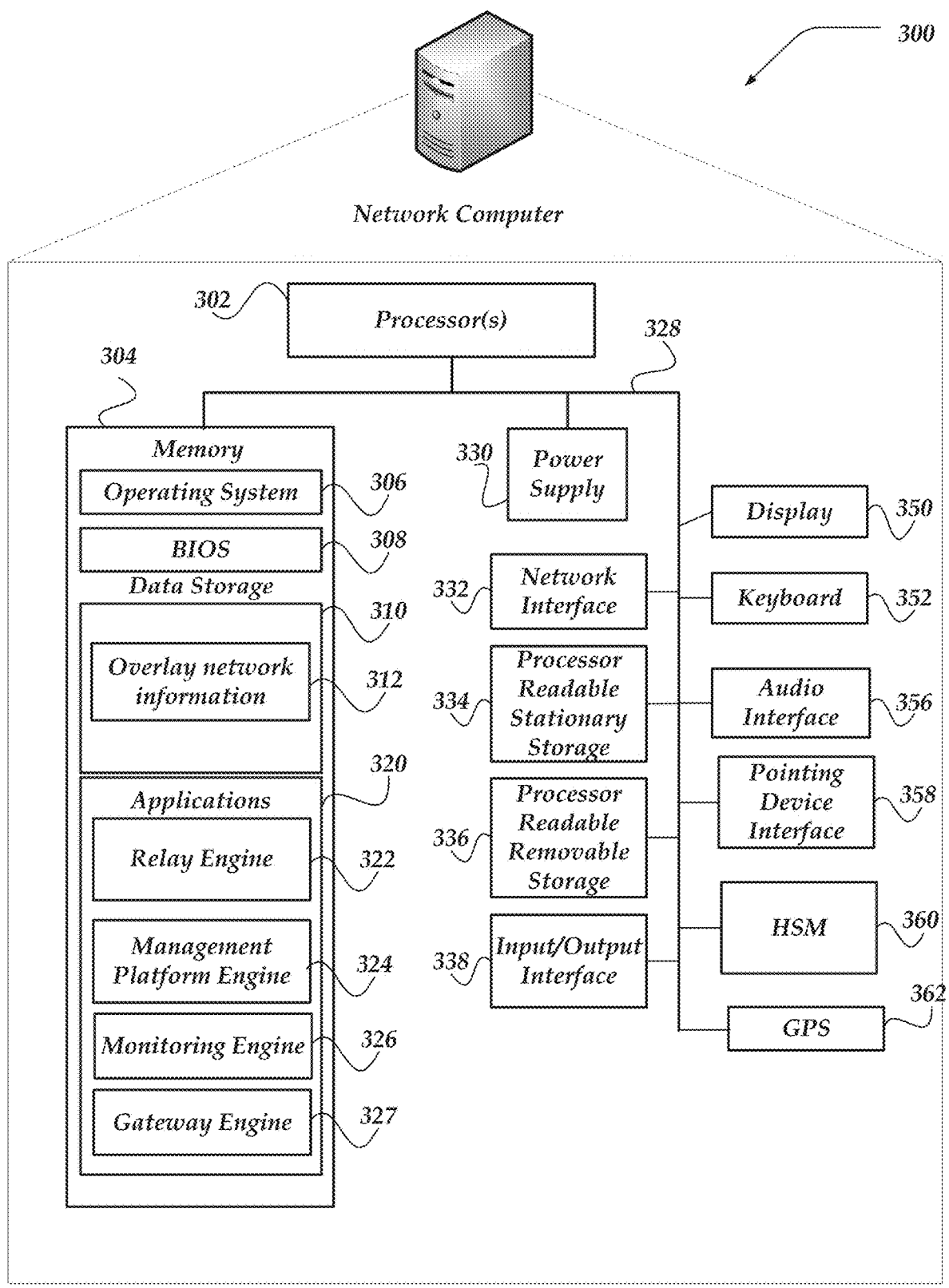
FIG. 3 illustrates a schematic embodiment of a network computer.

FIG. 3 shows one embodiment of network computer 300 that may be included in a system implementing the invention. Network computer 300 may include many more or less components than those shown in FIG. 3. However, the components shown are sufficient to disclose an illustrative embodiment for practicing these innovations. Network computer 300 may represent, for example, one embodiment of one or more of management platform server computer 116, gateway computers 118, relay computers 122, or one or more node computers 120 of FIG. 1.

As shown in the figure, network computer 300 includes a processor 302 in communication with a memory 304 via a bus 328. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

In at least one of the various embodiments, processor 302 may include one or more separate hardware processors that are arranged to perform one or more specific task or actions. Also, in some embodiments, the one or more hardware processors comprising processor 302 may be the same processor. In some embodiments, the one or more hardware processors comprising processor 302 may be the included in the same network computer. In some embodiments, one or more of the one or more hardware processors comprising processor 302 may be included in different network computers.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. Display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

GPS transceiver 362 can determine the physical coordinates of network computer 300 on the surface of the Earth, which typically outputs a location as latitude and longitude values. GPS transceiver 362 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 362 can determine a physical location for network computer 300. In at least one embodiment, however, network computer 300 may, through other components, provide other information that may be employed to determine a physical location of the client computer, including for example, a Media Access Control (MAC) address, IP address, and the like.

Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows® operating system, or the Apple Corporation's macOS® operating system. The operating system may include, or interface with a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of events, including being sent as part of a header during a communication, sent upon request, or the like. Data storage 310 may also be employed to store social networking information including address books, buddy lists, aliases, user profile information, or the like. Data storage 310 may further include program code, instructions, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300.

Data storage 310 may include, for example, overlay network information 312, or the like. Overlay network information 312 may contain policy data defining which gateways or node computers are allowed to communicate with each other as well as the physical network routes that may be available. In one embodiment, overlay network information 312 may be generated and stored on management platform servers, such as, management platform server computer 116 before being distributed to gateway computers 118, relay computers 122, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include relay engine 322, management platform engine 324, monitoring engine 326, or gateway engine 327 which may be enabled to perform actions further described below. In at least one of the various embodiments, one or more of the applications or portions of applications may be implemented as modules or components of another application. Further, in one or more of the various embodiments, applications or portions of applications may be implemented as operating system extensions, modules, plugins, or the like.

In at least one of the various embodiments, applications, such as, operating system 306, relay engine 322, management platform engine 324, monitoring engine 326, or gateway engine 327, or the like, may be arranged to employ geo-location information to select one or more localization features, such as, time zones, languages, currencies, calendar formatting, or the like. Localization features may be used when interpreting network traffic, interpreting node computer activity, monitoring or logging application activity, user-interfaces, reports, as well as internal processes or databases. In at least one of the various embodiments, geo-location information used for selecting localization information may be provided by GPS 362. Also, in some embodiments, geolocation information may include information provided using one or more geolocation protocols over the networks, such as, wireless network 108 or network 110.

Furthermore, in at least one of the various embodiments, relay engine 322, management platform engine 324, monitoring engine 326, or gateway engine 327, or the like, may be operative in a cloud-based computing environment. In at least one of the various embodiments, these applications, and others, that comprise the management platform may be executing within virtual machines or virtual servers that may be managed in a cloud-based based computing environment. In at least one of the various embodiments, in this context the applications may flow from one physical network computer within the cloud-based environment to another depending on performance and scaling considerations automatically managed by the cloud computing environment. Likewise, in at least one of the various embodiments, virtual machines or virtual servers dedicated to relay engine 322, management platform engine 324, monitoring engine 326, or gateway engine 327, or the like, may be provisioned and de-commissioned automatically. Also, in at least one of the various embodiments, overlay network information 312, or the like, may located in virtual servers running in a cloud-based computing environment rather than being tied to one or more specific physical network computers. In some embodiments, various applications, data storage, or the like, may be operative in one or more container computers executing in a container computing environment.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins or wireless transceivers) to perform some or all actions. In some embodiments, some or all of the actions may be performed by a system on a chip (COS), or the like.

Illustrative Logical System Architecture

Figure 4:
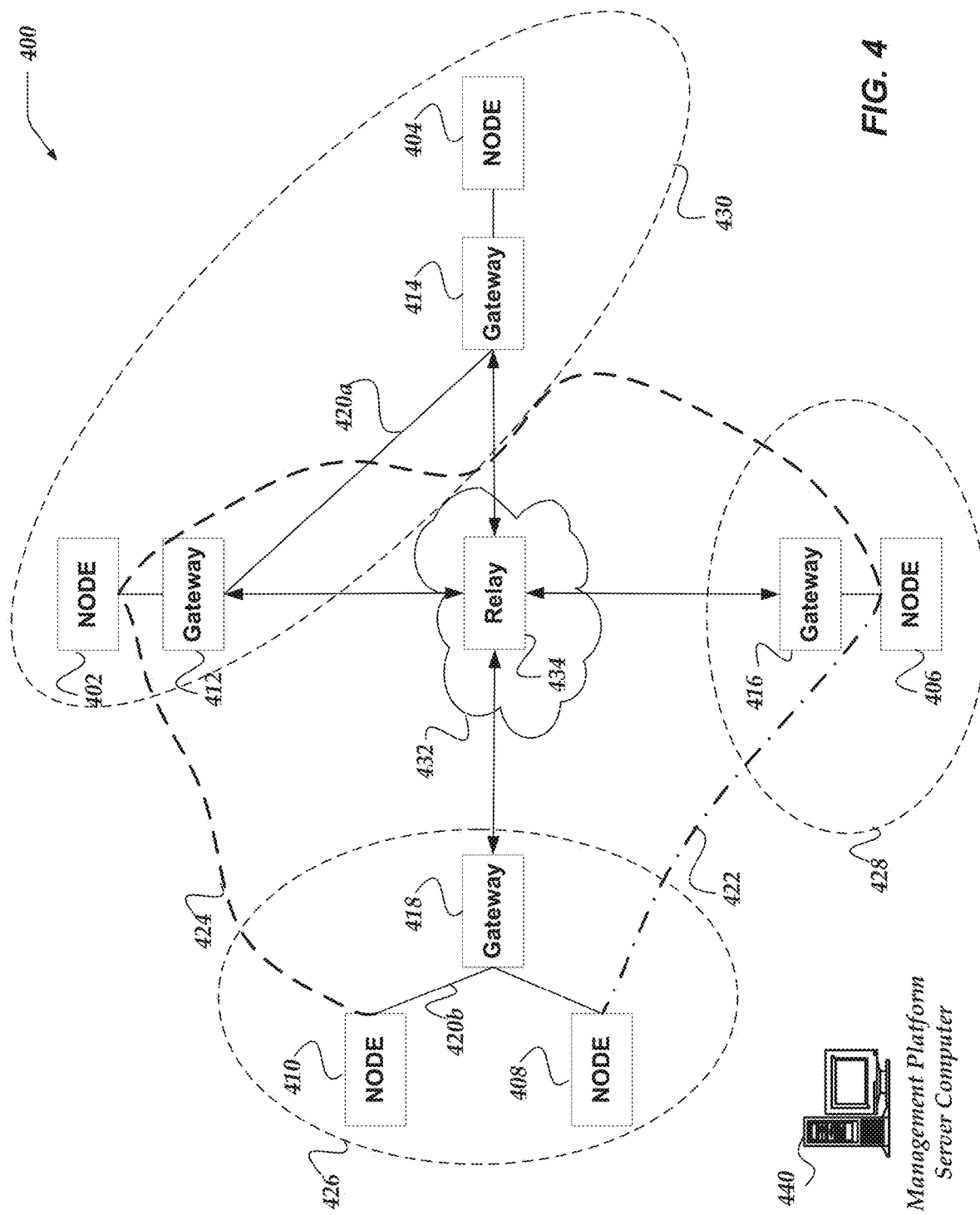
FIG. 4 illustrates a logical schematic of a network that includes overlay networks, node computers, gateway computers, relay computers, or the like, in accordance with at least one of the various embodiments.

FIG. 4 illustrates a logical schematic of network 400 that includes overlay networks, node computers, gateway computers, relay computers, or the like, in accordance with at least one of the various embodiments. Network 400 is arranged to include gateway computers, such as, gateway computers 412-418. Gateway computers may be disposed between one or more node computers and the underlying physical network infrastructure. In at least one of the various embodiments, the gateway computers may be arranged such that they isolate node computers, such as, node computers 402-410 from the physical network used to interconnect them. Also, in this example, management platform server computer 440 represents one or more management platform servers that may be assumed to be arranged to communicate over one or more networks with relay computers or gateway computers that comprise network 400. In one or more of the various embodiments, among other things, management platform server 440 may be arranged to manage the configuration or distribution of policy information to gateway computers, relay computers, or the like.

In this example, physical networks, such as, physical network 420a, physical network 420b, a public network 432 provide an underlying physical network comprising network 400. In this example, node computer 404 is isolated from physical network 420a by gateway computer 414.

Also, in one or more of the various embodiments, private networks, such as, private network 426, private network 428, or private network 430 may represent separate or isolated networks that may be configured to prevent computers from being visible or directly accessible from outside each of the private networks.

In some embodiments, gateway computers may be arranged to communicate with one or more relay computers, such as, relay computer 434 via another network, such as, network 432. In some embodiments, relay computer 434 may be arranged to have a network address that may be visible from computers that may be part of other networks, including private networks, such as, private network 420a and private network 420b, or the like.

Accordingly, in at least one of the various embodiments, the gateway computers may be configured to provide or enforce one or more overlay networks in network 400. In this example, for some embodiments, overlay network 422 enables node computer 406 and node computer 408 to "see" each other on the network; communication from node computer 406 to node computer 408 may be routed through gateway computer 416 to network 432 to relay engine 434 to gateway computer 418; and the communication may then be routed from gateway computer 418 to node 408 over private network 420b. From the point-of-view of node computer 406 and node computer 408 the communication appears to go directly over overlay network 422. In actuality the communication will be routed from node 406 to gateway computer 416 to relay engine 432 to gateway computer 418.

Likewise, in this example, network 400 may be arranged such that node computer 402, node computer 406, and node computer 410 communicate over overlay network 424. As described above, in at least one of the various embodiments, the communication among/between the nodes on overlay network 424 may be routed through relay engine 434 and two or more of the gateway computers.

In at least one of the various embodiments, the gateway computers may be configured with one or more rule-based policies that determine access or restrictions for network communication on the networks. The particular rules or restrictions associated with how network traffic (e.g., network packets) should be routed through the overlay network may be established by a management platform computer, such as management platform server computer 440, or the like. Configuration information may be pushed (e.g., routing tables, or the like) to each gateway computer to define the overlay networks, if any, as well other restrictions that may be applicable for one or more networks.

In at least one of the various embodiments, gateway computers may be arranged to include an explicit list of computer addresses/identities that are allowed to communicate with the gateway computer. In some embodiments, information associated with the underlay network, such as, network domain names, network address prefixes, or the like, may be provided to define some or all of the allowed communication targets. Accordingly, if a node computer, such as, node computer 410 is in gateway computer 418's list of allowed computers (e.g., a whitelist) it may be enabled to initiate communication over the overlay network through gateway computer 418. Conversely, node computers, or any other computer for that matter, not in a gateway computer's whitelist may be denied access to that gateway computer and the overlay networks. Though, in some embodiments, a node computer may be allowed to access one or more particular gateway computers and denied accessed to others. In at least one of the various embodiments, a management platform computer, such as, management platform server computer 440, may be arranged to manage and distribute the whitelists to the one or more gateway computers.

In at least one of the various embodiments, by placing gateway computers between physical networks (e.g., private network 420*a* or private network 420*b*) and the node computers, the configuration or definition of one or more overlay networks may be accomplished without requiring the individual node computers to be reconfigured. Further, in at least one of the various embodiments, gateway computers may comprise security hardened computers that provide various routing, security or cryptography features to help secure the one or more networks. Otherwise, in at least one of the various embodiments, the network may be reliant on the security features of the node computers themselves which may be non-existent or very limited.

In some embodiments, gateway computers may include multiple gateway links each providing access to one or more networks. In one or more of the various embodiments, gateway links may be arranged to provide secure or redundant access to one or more networks. In some embodiments, one or more gateway links may have access to one or more networks not available or accessible to some or all of the other gateway links.

In at least one of the various embodiments, overlay networks may be enforced by using one or more overlay whitelists that define the endpoints (e.g., node computers, gateway computers, relays computers, or the like) that may be accessed from other members of the overlay network. Accordingly, in at least one of the various embodiments, the computers on a given overlay network may be included on the overlay network whitelist. Likewise, in at least one of the various embodiments, computers absent from the overlay network may be omitted or excluded from the overlay network whitelist. Further, in at least one of the various embodiments, a computer may be included on more than one overlay network whitelist enabling it to be part of multiple overlay networks. In at least one of the various embodiments, management platform computer 440 may be arranged to manage and distribute the overlay whitelists to each gateway computer comprising an overlay network.

In some embodiments, computers in different networks may be unable to identify or access each other because their local networks are using separate (perhaps conflicting) network address namespaces. For example, gateway computer 418, and consequently, node computers 408 and 410, cannot be accessed from outside of the private network 420*b* without gateway computer 418 first initiating a connection outside of private network 420*b*. This may be true even if a public network address associated with private network 420*b* is known because the network address of node computers in private networks, such as, private network 420*b* are not generally available to computers outside of the same private networks.

In some embodiments, one or more relay computers, such as relay computer 434, may be associated with network addresses that are accessible from computers in one or more private or one or more public networks, in some cases, this may include the public Internet. In one embodiment, a node computer may request that a gateway computer initiate a connection to another node computer via another gateway computer that are located in another network. However, if neither gateway computer can reach the other, because they are both located in separate private networks, one or more relay computers, such as, relay computer 434 may be employed to bridge the networks to enable node computers in one network to reach node computers in another network.

In one or more of the various embodiments, while in some cases, gateway computers may be stationary on a network, in that they maintain the same network address indefinitely, the network address for a gateway computer may change from time to time. For example, a gateway computer may be moved to a different location, e.g. to another building on a corporate campus that is associated with a different range of network addresses. Similarly, a gateway that is a mobile device such as a smart phone may pass between cell towers or access points, each of which may be associated with a different network addresses. In one or more of the various embodiments, gateway computers may also experience a change in network address if the network changes, e.g. if a new internet service provider (ISP) is introduced. However it happens, if a network address associated with a gateway computer changes, any existing connections using that network address will be dropped. However, because identity based networking does not rely on a host's location as identity, the connection can be seamlessly re-established if management platform server 440 discovers the change and broadcasts the new network address for the gateway computer. For example, if gateway computer 416 determines that its network address has changed, it will notify its associated management platform server of the change. In one or more of the various embodiments, the management platform server may then broadcast updated policies that include rules for the new network address. Also, in some embodiments, gateway computers that experience network address changes may be arranged to actively notify their associated management platform servers of the network address changes. In such cases, for some embodiments, the management platform may authenticate change of address notifications based on gateway computer GIDs that may be included in the notification messages. Accordingly, in one or more of the various embodiments, an existing connection between gateway computer 416 and gateway computer 412 through relay engine 434 may continue once relay engine 434 receives an updated policy from management platform server 440.

It is also possible for a device, such as one of node computers 402, 404, 406, 408, or 410, to be moved to a different gateway computer. In this scenario, management platform server 440 has to be notified of the new configuration before the node computer is to work again properly. For example, if node computer 410 were moved from private network 420*b* to private network 420*a*, management platform server 440 could be informed, either manually or automatically, and then update relevant relay engines with new policies. Existing connections may time-out or reset automatically, when it is discovered that endpoint no longer exists at the network address the connection is directed towards. Once a connection has timed-out or reset, a new connection may be initiated and the connection between endpoints may continue uninterrupted.

Figure 5:
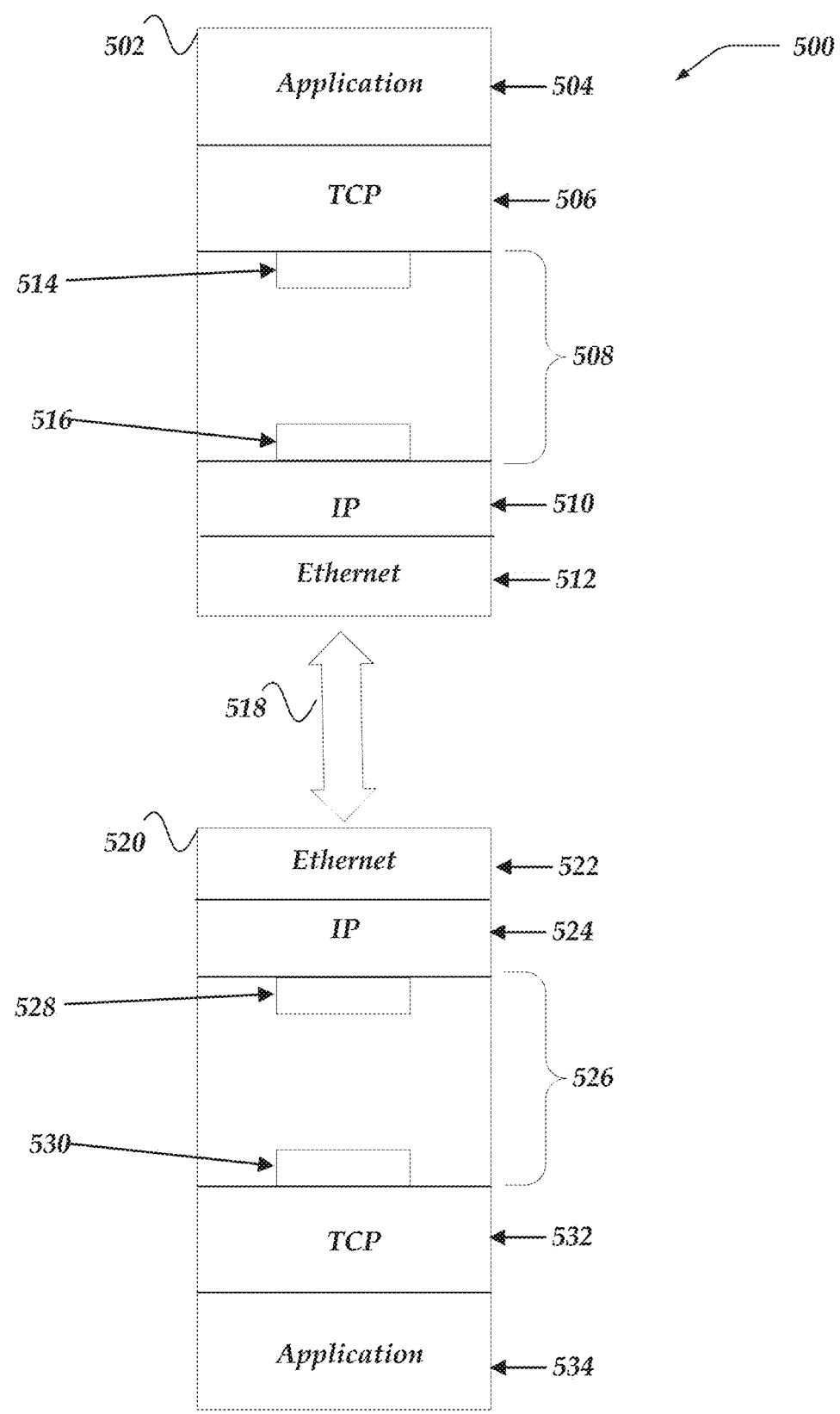
FIG. 5 illustrates a logical representation of a system for communicating in a network in accordance with at least one of the various embodiments.

FIG. 5 illustrates a logical representation of system 500 for communicating in a network in accordance with at least one of the various embodiments. In at least one of the various embodiments, communications that are processed on a gateway computer may comprise various logical layers that may comprise a functional network communication stack. In at least one of the various embodiments, a communication on one gateway computer, such as, communication 502 may be arranged such that an application layer, such as, application layer 504 may perform actions that include communication; next at layer 506, one or more standard network protocols APIs (TCP in this example) may be employed; at layer 508 one or more special actions may be performed to support the overlay networks. And, before the communication is sent out, the lower level layers, such as, layer 510 (IP layer in this example) or layer 512 (Ethernet later in this example) may be applied.

In at least one of the various embodiments, gateway computers may be arranged to substitute their GID for use as a network address by higher layers such as application layer 504 and TCP layer 506. The GID may be arranged to be compatible with the native data structures that may be used to represent actual network addresses. Accordingly, in at least one of the various embodiments, application level networking API's that accept network address data structures as parameters may be enabled to accept GID instead. For example, in some embodiments, an internet address may be represented using a 32-bit value. Thus, in such embodiments, the GID may be a 32-bit number, making it size compatible with an ordinary network address value of an underlay network.

In at least one of the various embodiments, at the gateway layer, layer 508 in FIG. 5, the GID of the source gateway or the target gateway are mapped to an actual network address. In at least one of the various embodiments, component 514 may represent components that are arranged to map GIDs to network addresses, and component 516 may represent components that are arranged to map from a network address to a GID.

In at least one of the various embodiments, since the GIDs may be mapped to an actual network addresses, network layers, such as IP layer 510 or Ethernet layer 512 may generate the appropriate network protocol information for the communication. Accordingly, in at least one of the various embodiments, network path 518 may be employed to communicate the communication network packets to its next destination.

In at least one of the various embodiments, communication 520 represents the received version of communication 502. The network protocol layers (Ethernet layer 522 or IP layer 522) may accept the communication over the network; gateway layer 526 employs component 528 and component 530 to map network addresses to GIDs; TCP layer 532 performs higher level network protocol actions using the GID in place of the network address; and application layer 534 employs the payload of the communication to perform application specific actions based on the actual contents of the payload.

In one or more of the various embodiments, network layers, such as, IP layer 510, Ethernet layer 512, Ethernet layer 522, or IP layer 524 may be associated with one or more network ports or one or more network links, hereinafter referred to as network ports or ports. In some embodiments, if there may be more than one port, gateway computers may be arranged to bridge one or more of the ports such that the bridged ports may be associated with the same network address information. Accordingly, in some embodiments, individual bridged ports may be associated with the same overlay policy because devices interacting with the bridged port may treat them as if they are same physical port even though there are more than physical connection (or more than one radio transceiver). Similarly, in some embodiments, if gateway computers have two or more ports, they may be grouped into two or more port groups that may include one or more ports each.

Alternatively, in one or more of the various embodiments, one or more ports of a gateway computer with multiple ports may be individually assigned overlay policy or otherwise considered independently from each other. Accordingly, in some embodiments, gateway engines may be arranged to distinguish individual ports or port groups on gateway computers from each other as described in more detail below.

FIGS. 6A-6F illustrate a logical representation of system 600 for relay node management for overlay networks in accordance with one or more of the various embodiments.

Figure 6A:
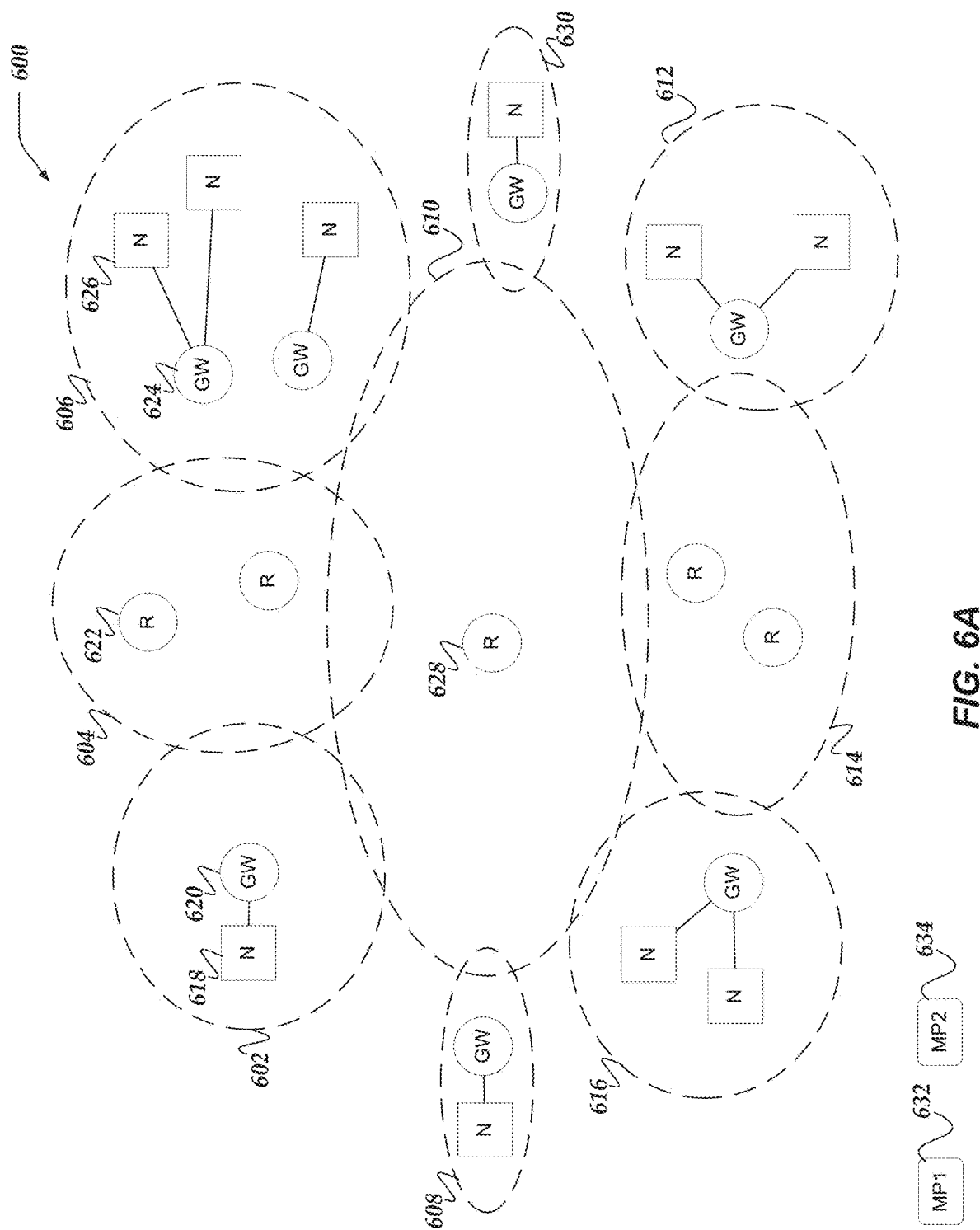
FIG. 6A illustrates a logical representation of a system for relay node management for overlay networks in accordance with one or more of the various embodiments.

FIG. 6A illustrates a logical representation of system 600 for relay node management for overlay networks in accordance with one or more of the various embodiments. Similar to network 400 described above, system 600 includes one or more networks, one or more relay computers, one or more gateway computers, one or more node computers, one or more management platform computers, or the like.

In this example, networks, such as, network 602, network 604, network 606, network 608, network 610, network 612, network 614, network 616, network 630, or the like, represent separate physical underlay networks or underlay network segments that may require underlay network routers, or the like, to route network traffic between them. In this example, the logical extent of each separate underlay network is represented by the dashed-line ellipses. Also, in this example, if two or more ellipses are illustrated as overlapping, the overlapping areas represent one or more devices (not shown) that may be configured to route or otherwise bridge underlay network traffic between the underlay networks represented by the overlapping ellipses.

Also, in this example, the various networks are illustrated as having various, node computers, gateway computers, relay computers, or the like, enclosed or included within them. One of ordinary skill in the art will appreciate that production networks may include many more or different devices or computers that for brevity or clarity have been omitted from the figures illustrating system 600.

Further, in some embodiments, systems, such as, system 600 may include one or more node computers, such as, node computer 618, node computer 626, or the like. Also, in some embodiments, systems, such as, system 600 may include one or more gateway computers, such as, gateway computer 62, gateway computer 624, or the like. Also, in some embodiments, systems, such as, system 600 may include one or more relay computers, such as, relay computer 622, relay computer 628, or the like. And, also, in some embodiments, systems, such as system 600 may include one or more management platform computers, such as, management platform computer 632, management platform computer 634, or the like. For brevity and clarity reference numbers are omitted for items that are not discussed specifically. However: each square with an enclosed 'N' may be considered a node computer; each circle with an enclosed 'GW' may be considered a gateway computer; each circle with an enclosed 'R' may be considered a relay computer; or the like. In subsequent figures (e.g., FIGS. 6B-6F) additional reference numbers may be included as appropriate.

Also, in one or more of the various embodiments, systems, such as, system 600 may be arranged to include one or more management platform computers, such as, management platform computer 632, management platform computer 634, or the like. In one or more of the various embodiments, management platform engines may be considered to be hosted on management platform computers.

In this example, management platform computers may be considered to have network access to gateway computers, relay computers, or the like, included in system 600. In some embodiments, management platform engines on management platform computers may be arranged to communicate with the gateway computers, relay computers, other management platform engines, or the like, via a control plane that may be implemented over the underlay networks rather than being restricted to using an overlay network. Also, in some embodiments, management platform engines may be arranged to employ specialized or dedicated overlay network as a control plane for communicating with other management platform engines, gateway computers, relay computers, or the like.

In one or more of the various embodiments, gateway computers may be configured to have a gateway identity (GID) that may be considered unique within the overlay network. Further, in one or more of the various embodiments, gateway computers may be configured to have a network address for at least one relay computer or one management platform engine. Accordingly, in one or more of the various embodiments, if a gateway computer may be added to an underlay network and assigned a network address for the underlay network, the gateway computer may employ the known relay computer network address or management platform computer network address to announce its network address to the management platform engine running on a management platform computer. In one or more of the various embodiments, the management platform engine may be enabled to associate the GIDs of gateway computers with their current underlay network address. Accordingly, in some embodiments, the management platform engine may be arranged to generate overlay network policy information that define how the underlay network may be used to provide the overlay network. Thus, in some embodiments, the management platform engine may provide the overlay network policy information to each gateway computer after they announce themselves, enabling the gateway computer to join the overlay network.

Figure 6B:
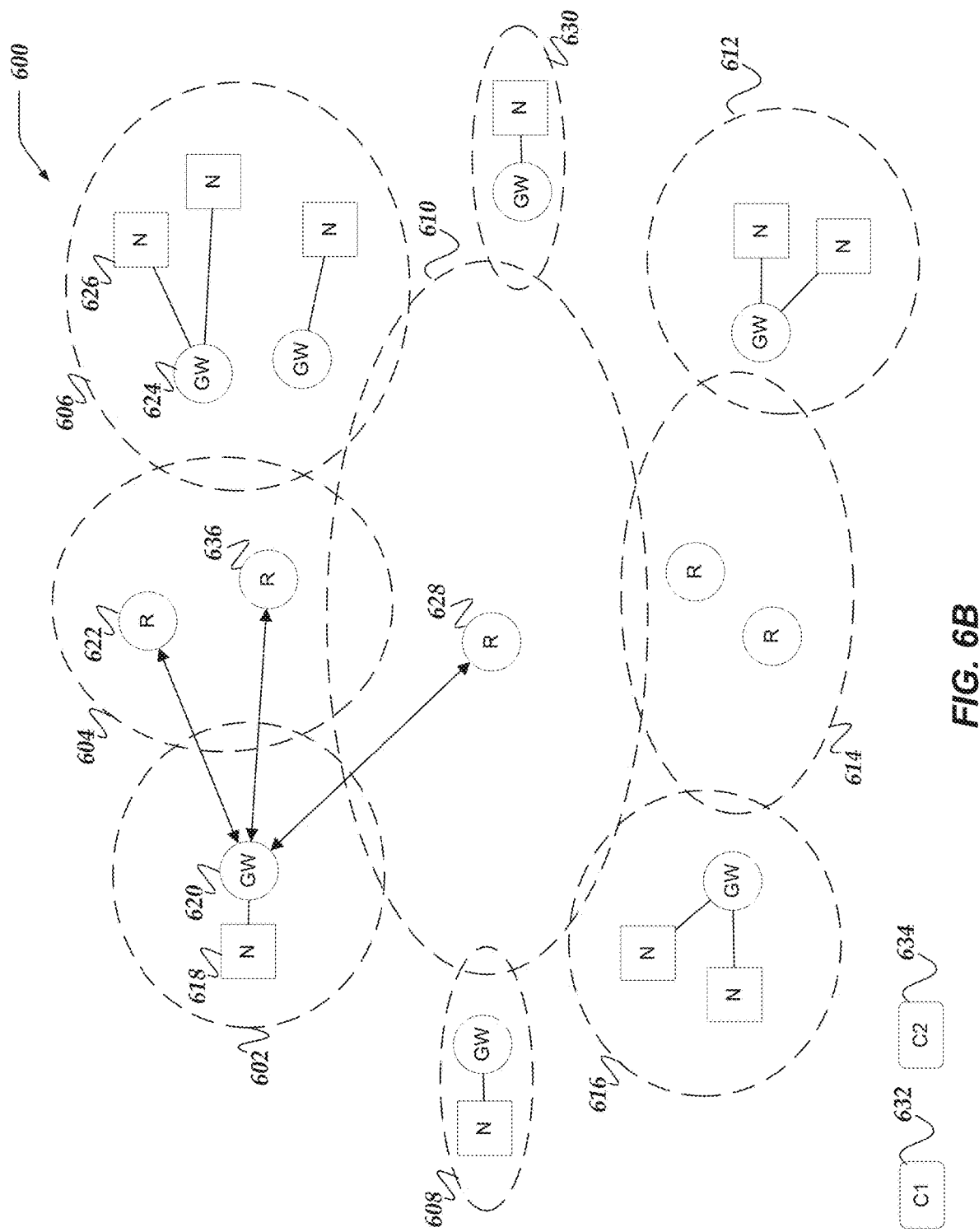
FIG. 6B illustrates a logical representation of a system for relay node management for overlay networks in accordance with one or more of the various embodiments.

FIG. 6B illustrates a logical representation of system 600 for relay node management for overlay networks in accordance with one or more of the various embodiments. Similar to network 400 described above, system 600 includes one or more networks, one or more relay computers, one or more gateway computers, one or more node computers, one or more management platform computers, or the like.

For brevity, descriptions of components or actions described in FIG. 6A are not repeated here unless necessary for providing clarity.

As described above, more than one relay computer may be available to gateway computers. In some embodiments, gateway computers may be provided configuration information by their associated management platform engines that enables them to locate or authenticate the relay computers they may access. In some embodiments, gateway computers may be provided configuration information that associates node computers or gateway computers with a particular relay computer. In some embodiments, gateway computers may be pre-loaded/provisioned with initial configuration information that enables gateway computers to bootstrap themselves into the overlay network. In some embodiments, such information may include security credentials, the management platform engine identity information (e.g., GID or control plane identifiers) of a management platform engine, and a network address to at least one relay computer.

In one or more of the various embodiments, underlay network addresses may be associated with relay computers. Accordingly, in some embodiments, management platform engine may generate overlay network policy information that includes the location of one or more relay computers.

In some embodiments, one or more relay computers may be preferred over others depending on the circumstances or performance criteria. For example, in some embodiments, gateway computers may be configured to prefer relay computers that have one or more performance metrics that may be better than other relay computers. In some embodiments, performance metrics may include metrics, such as, latency, distance (e.g., network hops), load, other policy considerations, or the like. In this example, system 600 enables gateway computer 620 to employ relay computer 622, relay computer 636, or relay computer 628 to access gateway computer 624, one of which may be selected depending on the performance metrics of the relay computers.

Accordingly, in one or more of the various embodiments, gateway computers may be arranged to probe one or more relay computers to determine a preferred relay computer to employ to reach other gateway computers or node computers that may be in different underlay networks. In this example, the bi-directional arrows from gateway computer 620 to relay computer 622, relay computer 636, or relay computer 628 represent probing activity performed by a gateway computer to evaluate relay computers.

In some embodiments, gateway computers may be arranged to periodically execute one or more probing actions to evaluate the relay computers that may be available to it. Thus, in some embodiments, gateway computers may maintain update records of the performance of the relay computers that may be available.

In one or more of the various embodiments, gateway computers may be arranged to employ one or more relay evaluation models to determine the one or more probing actions that may be employed to evaluate relay computers. In some embodiments, management platform engines may be arranged to provide instructions to gateway computers that may determine which relay evaluation models may be used. In some embodiments, management platform engine may provide relay evaluation models or configuration information associated with relay evaluation models to gateway computers. Accordingly, in some embodiments, gateway computers may employ the relay evaluation models to evaluate relay computers.

In one or more of the various embodiments, relay evaluation models enable management platform engines to tailor the probing actions based on local conditions or local circumstances. Also, in some embodiments, relay evaluation models may be configured collect a variety of different metrics associated with relay computers depending the local environment or local requirements.

In some embodiments, one or more metric values collected by relay evaluation models may be provided to relay selection models for selecting a preferred relay computer. In one or more of the various embodiments, relay selection models may vary depending on local requirements, local policy, or the like. Accordingly, in some embodiments, management platform engines may be arranged to determine the relay selection models that may be available to each gateway computer.

In one or more of the various embodiments, one or more metrics may be related to performance metrics of the underlay network. For example, a latency measure from a gateway computer to a relay computer may measure the performance of the underlay network. Likewise, in some embodiments, distance measurements (e.g., number of hops to reach a relay computer) may measure the number of hops it takes for network traffic to reach the relay computer whereas such hops may be invisible to node computers or gateway computer using the overlay network to communicate overlay traffic.

In one or more of the various embodiments, gateway computers may be deployed with built-in or default relay evaluation models or relay selection models. However, in some embodiments, management platform engines may be arranged to modify or update the relay evaluation models or relay selection models for a given gateway computer. Accordingly, in some embodiments, management platform engine may be arranged to provide relay evaluation models or relay selection models to gateway computers as part of the configuration information used to enable the gateway computer to access overlay networks. In some embodiments, rather than providing relay evaluation models or relay selection models to gateway computers, management platform engines may provide references or identifiers that indicate which models a gateway computer should employ. For example, in some embodiments, management platform engines may be arranged to direct a gateway computer to employ a relay evaluation model or relay selection model from two or more relay evaluation models or relay selection models that were installed on the gateway computer prior to the gateway computer joining the overlay network.

In one or more of the various embodiments, gateway computers may be arranged to periodically perform probing actions to acquire the metrics that enable a determination of a preferred relay computer. For example, in some embodiments, gateway computers may be configured to probe relay computers every five minutes, or the like. In some embodiments, relay evaluation models may be arranged to determine when or how often to probe relay computers. Also, in some embodiments, relay evaluation models may be configured to probe different metrics at different periods.

Figure 6C:
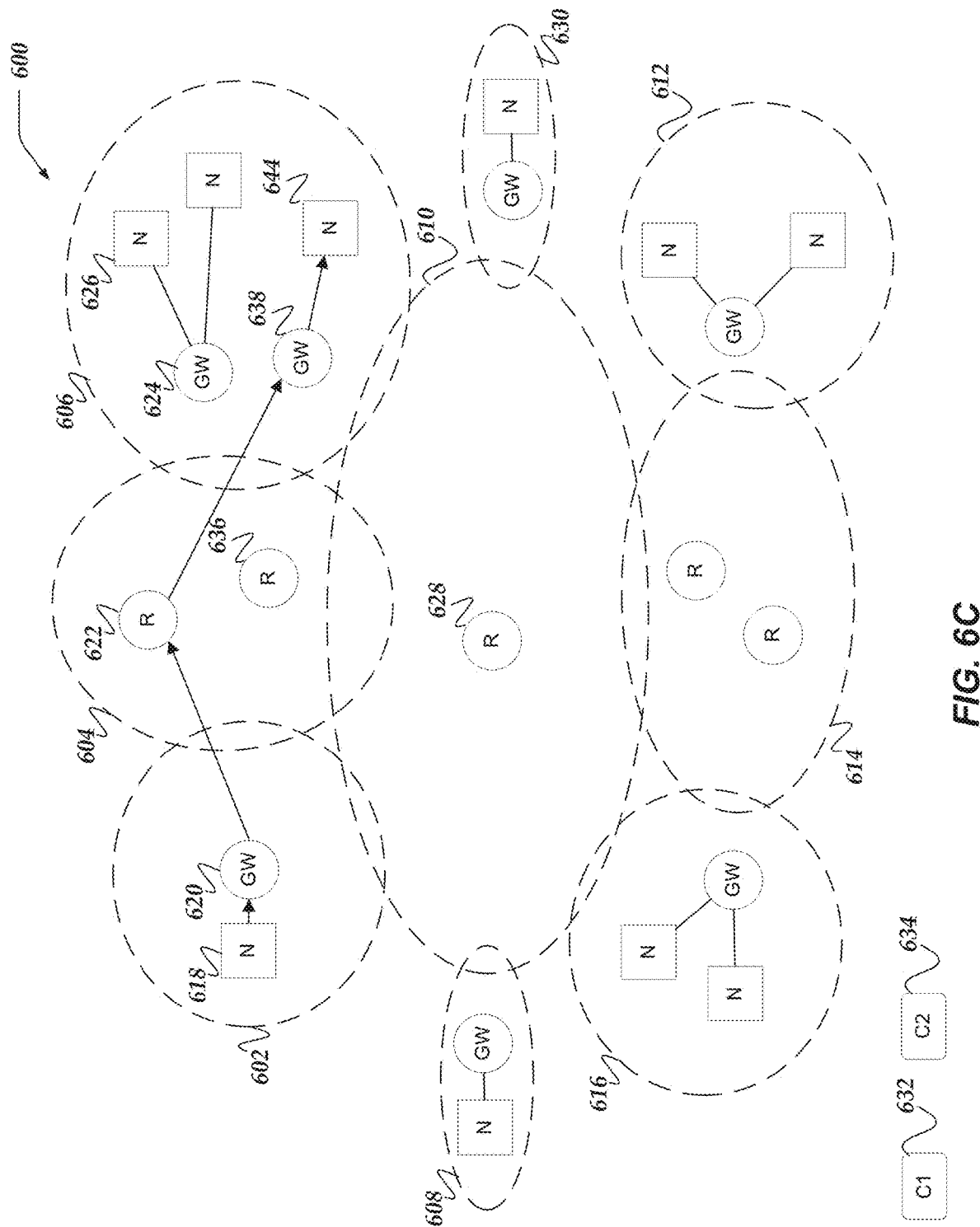
FIG. 6C illustrates a logical representation of a system for relay node management for overlay networks in accordance with one or more of the various embodiments.

FIG. 6C illustrates a logical representation of system 600 for relay node management for overlay networks in accordance with one or more of the various embodiments. Similar to network 400 described above, system 600 includes one or more networks, one or more relay computers, one or more gateway computers, one or more node computers, one or more management platform computers, or the like.

For brevity descriptions of components or actions described in FIG. 6A, FIG. 6B, or the like, are not repeated here unless necessary for providing clarity.

In this example, node computer 618 may be considered to have sent a communication over the overlay network to node computer 644. Accordingly, in some embodiments, a management platform engine on management platform computer, such as, management platform engine 632, may have provided overlay policy information to gateway computer 620 that may be employed to determine if node computer 618 is authorized to communicate with node computer 644. In this example, node computer 618 is in network 602 and node computer 644 is in network 606. As described above, node computers may be arranged to route overlay network traffic through their designated gateway computers, otherwise the overlay network may be inaccessible to them.

In some embodiments, if gateway computer 620 determines that node computer 618 may access node computer 644 over the overlay network, it may forward the communication to relay computer 622, which in turn relays the traffic to gateway computer 638 for delivery to node computer 644.

In this example, gateway computer 620 is depicted as employing relay computer 622 to forward the overlay traffic from node computer 618 towards node computer 644. Accordingly, in one or more of the various embodiments, gateway computer 620 employed relay computer 622 because relay computer 622 is preferred over relay computer 636 and relay computer 628 to provide the overlay traffic to node computer 644.

In this example, gateway computer 620 has employed one or more relay evaluation models to collect metrics associated with relay computer 622, relay computer 636, and relay computer 628. Likewise, gateway computer 620 employed one or more relay selection models and the collected metrics to determine which of relay computer 622, relay computer 636, or relay computer 628 is preferred for relaying the overlay traffic to gateway computer 638.

Figure 6D:
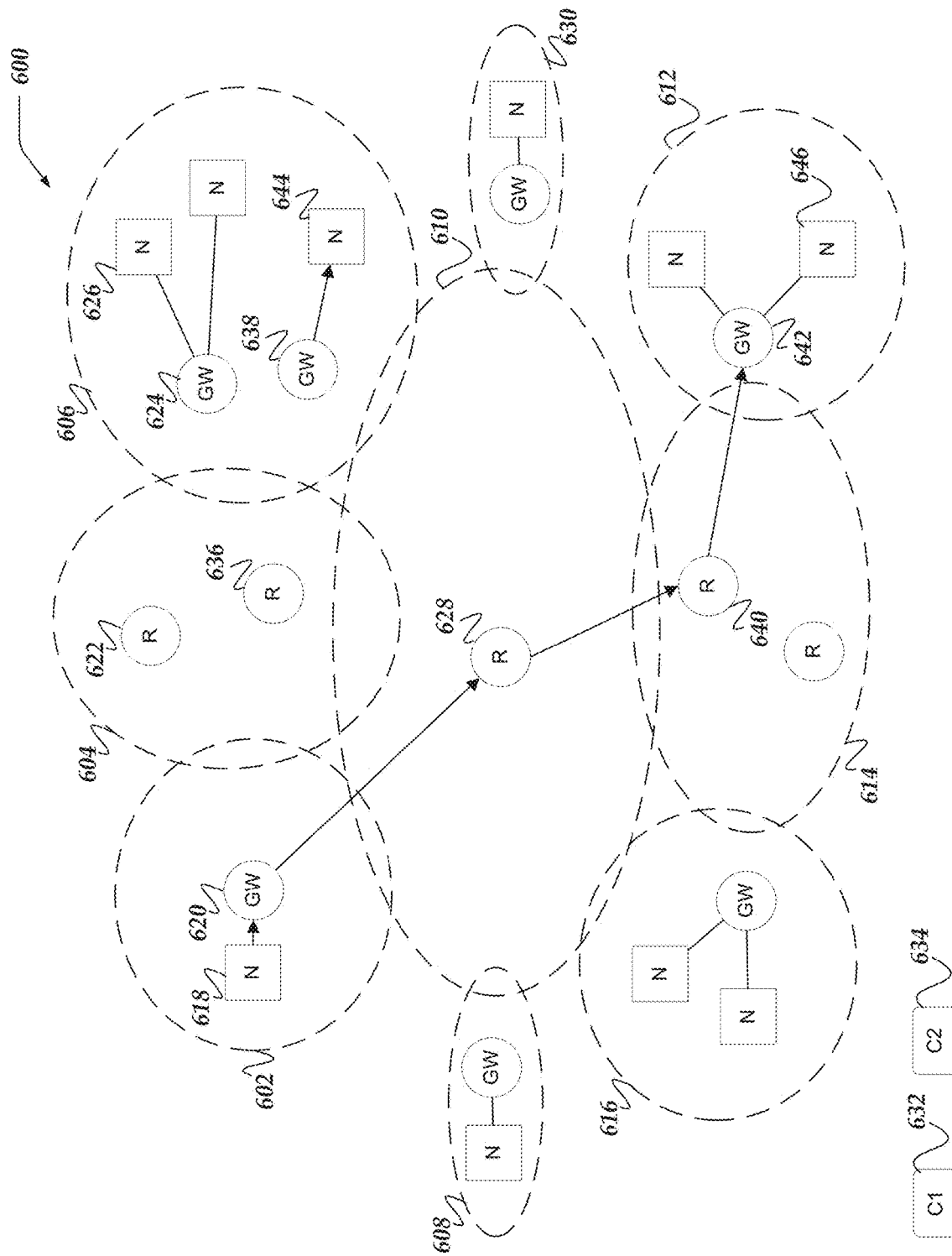
FIG. 6D illustrates a logical representation of a system for relay node management for overlay networks in accordance with one or more of the various embodiments.

FIG. 6D illustrates a logical representation of system 600 for relay node management for overlay networks in accordance with one or more of the various embodiments. Similar to network 400 described above, system 600 includes one or more networks, one or more relay computers, one or more gateway computers, one or more node computers, one or more management platform computers, or the like.

For brevity descriptions of components or actions described for FIG. 6A, FIG. 6B, FIG. 6C, or the like, are not repeated here unless necessary for providing clarity.

In one or more of the various embodiments, in some cases, two or more relay computers may be required to reach some gateway computers or some node computers. Accordingly, in some embodiments, gateway computers may be arranged to forward overlay traffic to a first relay computer and then that overlay traffic may be in turn forwarded to one or more other relay computers until the target gateway computer may be reached.

In this example, gateway computer 620 may be forwarding overlay traffic from source node computer 618 to target node computer 646.

In one or more of the various embodiments, management platform engines may be arranged to provide policy information to relay computers that enable them to determine next-hop relay computers. In some embodiments, the policy information defining multi-hop paths may be provided to gateway computers. Also, in some embodiments, management platform engines may be arranged to provide policy information to gateway computers that enable them to forward traffic to relay computers for multi-hop forwarding to the ultimate destination.

In one or more of the various embodiments, if a source gateway computer may be provided information that includes the number of relay hops for a given network path to a target gateway computer, the source gateway computer may be arranged to provide the hop count information as inputs to relay evaluation models or relay selection models as part of determine preferred relay computers.

Figure 6E:
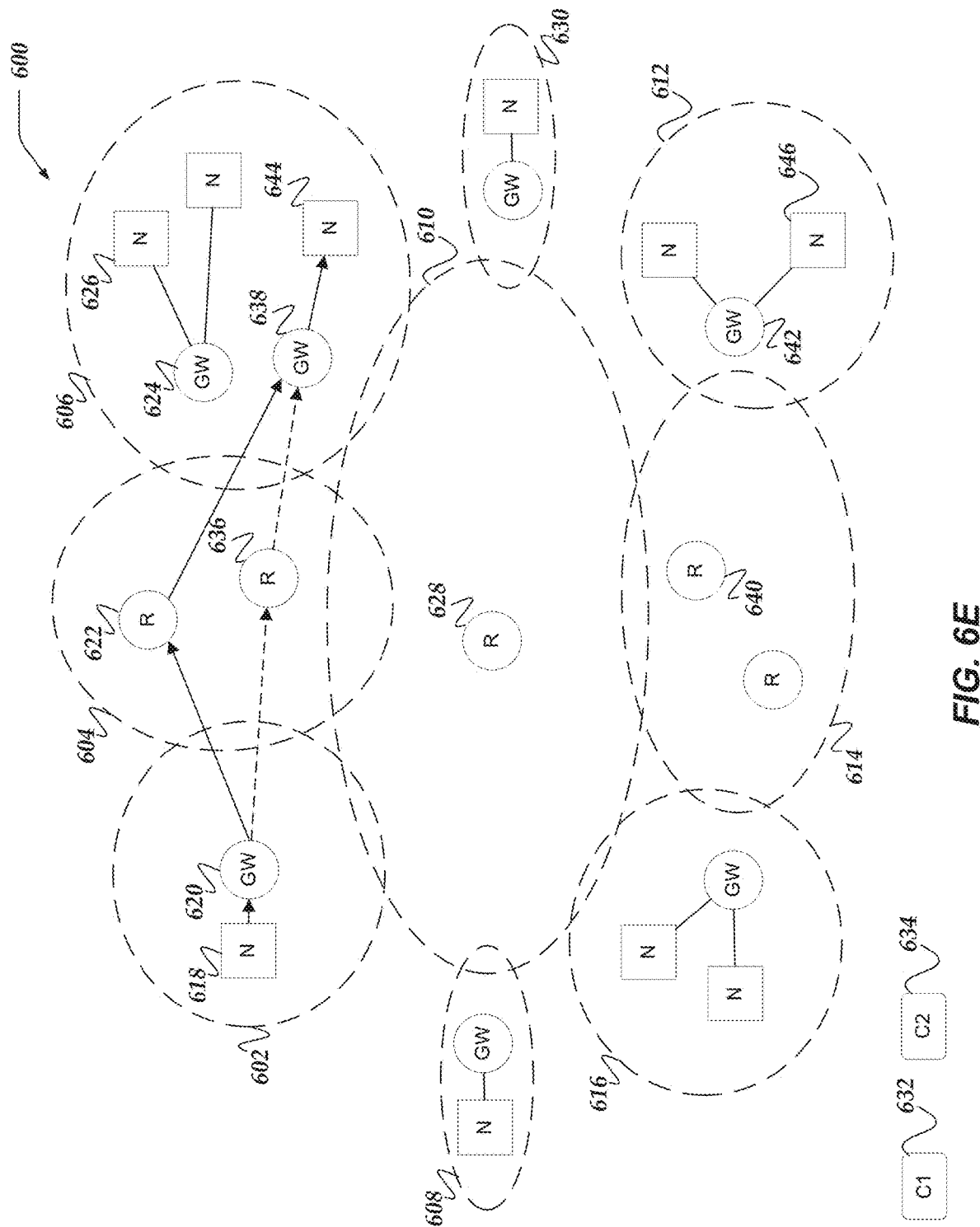
FIG. 6E illustrates a logical representation of a system for relay node management for overlay networks in accordance with one or more of the various embodiments.

FIG. 6E illustrates a logical representation of system 600 for relay node management for overlay networks in accordance with one or more of the various embodiments. Similar to network 400 described above, system 600 includes one or more networks, one or more relay computers, one or more gateway computers, one or more node computers, one or more management platform computers, or the like.

For brevity descriptions of components or actions described for FIG. 6A, FIG. 6B, FIG. 6C, FIG. 6D, or the like, are not repeated here unless necessary for providing clarity.

In some embodiments, a source node computer, such as node computer 618 may be in continuous or semi-continuous communication with the same target node computer, such as, node computer 644 over the overlay network. In some embodiments, such communications may be considered communication sessions, long-lived connections, or the like. In some embodiments, communication sessions may enable some portions of the overlay traffic tunnel employed to establish the overlay network over the underlay network to remain intact for a period of time rather than rebuilding the overlay traffic tunnel for each overlay traffic transmission.

Accordingly, in some embodiments, gateway computers may be arranged to continue probing for some or all of the metrics to select preferred relay computers. In some embodiments, if the gateway computer determines that another relay computer may be preferred over the relay computer that is part of an active overlay traffic tunnel, the gateway computer may change from using the current relay computer to the new preferred relay computer. Accordingly, in some embodiments, gateway computers may be arranged to tear down the current overlay traffic tunnel to enable a different relay computer to be employed.

In this example, gateway computer 620 has established an overlay traffic tunnel to gateway computer 638 that employs relay computer 622 to traverse the intervening underlay networks. However, in this example, gateway computer 620 has continued to probe the relay computers available for reaching gateway computer 638. Thus, in this example, gateway computer 620 has employed its relay selection models to determine that relay computer 636 may be preferred over relay computer 622 to forward overlay traffic to gateway computer 638. Accordingly, in this example, as indicated by the dashed arrows, gateway computer 620 may be enabled to automatically establish a new overlay traffic tunnel that uses relay computer 636 to forward overlay traffic to gateway computer 638 as represented by the dashed arrows.

In one or more of the various embodiments, gateway computers may be arranged to maintain a list of available relay computers that may be rank ordered based on preference criteria established by its relay selection models. Accordingly, in some embodiments, gateway computers may be arranged to employ the rank ordered list of relay computers to select the next preferred relay computer in between probing actions. Thus, in some embodiments, if a preferred relay computer becomes unresponsive, the next highest preferred relay computer may be selected from the rank ordered list generated based on recent probing.

In one or more of the various embodiments, if a gateway computer determines that another relay computer may be preferred over the current preferred relay computer, it may employ the overlay network protocol to redirect the overlay traffic to use the other relay computer. Accordingly, in some embodiments, gateway computers may be arranged to select another relay computer by sending a reset command, or the like, that forces the current overlay traffic tunnel to be torn down. Thus, in some embodiments, if overlay traffic is sent to the same target gateway computer again, a new overlay tunnel may be automatically created using the new preferred relay computer.

In some embodiments, gateway computers may be arranged to employ relay computer probing to determine if a relay computer has failed or if it has one or more performance metrics that have values below a defined threshold. Accordingly, in some embodiments, gateway computers may be arranged to automatically select the next-best preferred relay computer if a relay computer becomes unavailable.

Figure 6F:
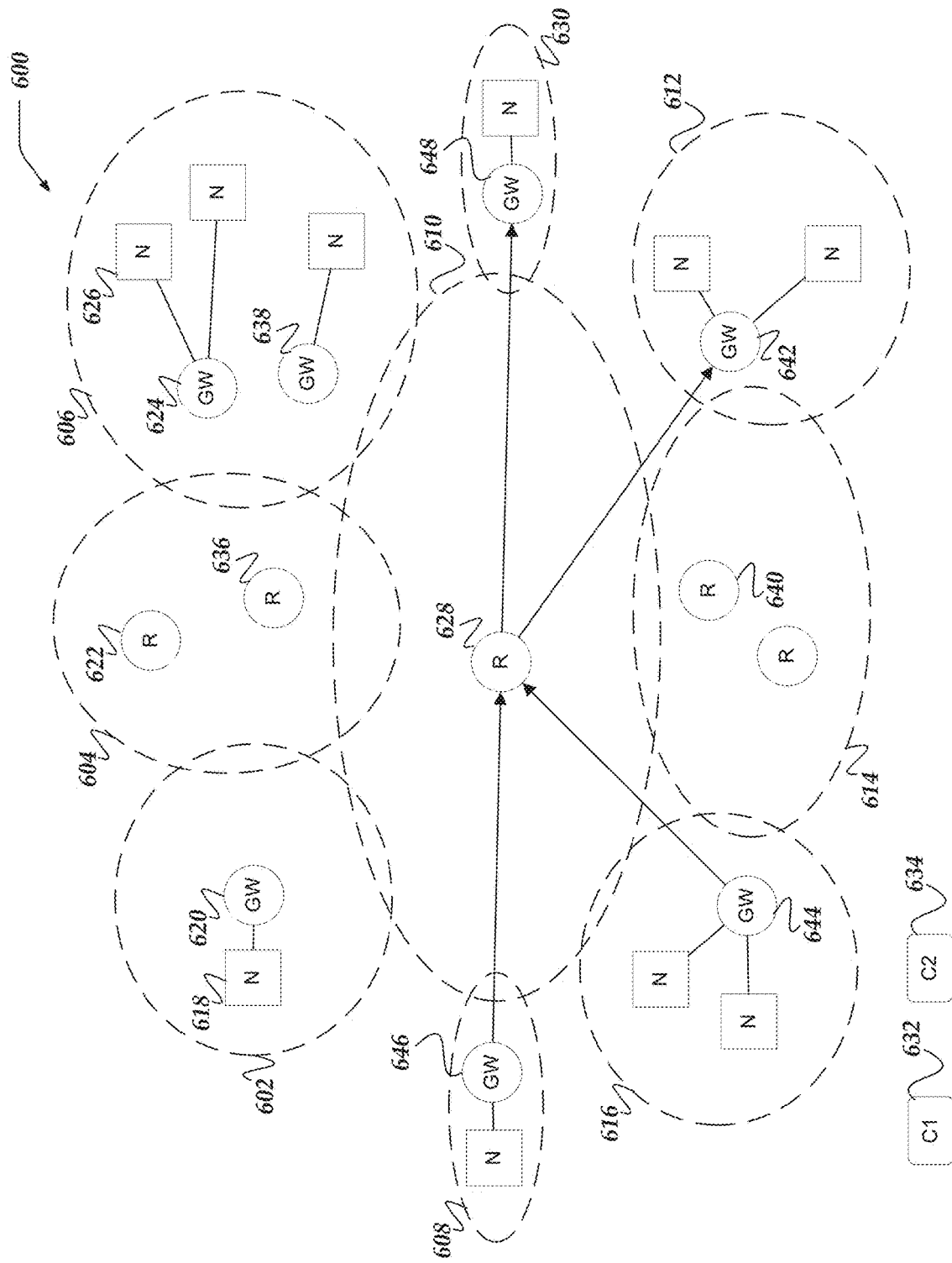
FIG. 6F illustrates a logical representation of a system for relay node management for overlay networks in accordance with one or more of the various embodiments.

FIG. 6F illustrates a logical representation of system 600 for relay node management for overlay networks in accordance with one or more of the various embodiments. Similar to network 400 described above, system 600 includes one or more networks, one or more relay computers, one or more gateway computers, one or more node computers, one or more management platform computers, or the like.

For brevity descriptions of components or actions described for FIG. 6A, FIG. 6B, FIG. 6C, FIG. 6D, FIG. 6E, or the like, are not repeated here unless necessary for providing clarity.

In some embodiments, relay computers may be arranged to support multiple tenants. Accordingly, in some embodiments, the same relay computers may be shared by different overlay networks that may be managed by different management platform engines each associated with a tenant.

In one or more of the various embodiments, relay computers that support multiple tenants may be associated with a control management platform engine that coordinates the information of the tenant management platform engines. Accordingly, in one or more of the various embodiments, the control management platform engine may be arranged to authorize and authenticate the tenant management platform engines with the shared relay computer. Accordingly, in some embodiments, the tenant management platform engines may share routing information or policy information for the overlay network that they manage with the shared relay computer.

Alternatively, in some embodiments, control management platform engines may be arranged to communicate with the tenant management platform engines to obtain their routing information. Thus, in some embodiments, the control management platform engines may be arranged to distribute the tenant routing information to the shared relay computer. Further, in some embodiments, control management platform engines may be arranged to apply meta-policy that may be applied to the different tenant overlay networks. For example, in some embodiments, meta-policy provided by a control management platform engine may restrict one or more tenants to using particular relay computers. Likewise, for example, meta-policy rules may be used to prioritize access to one or more relay computers for one or more tenants.

Figure 7:
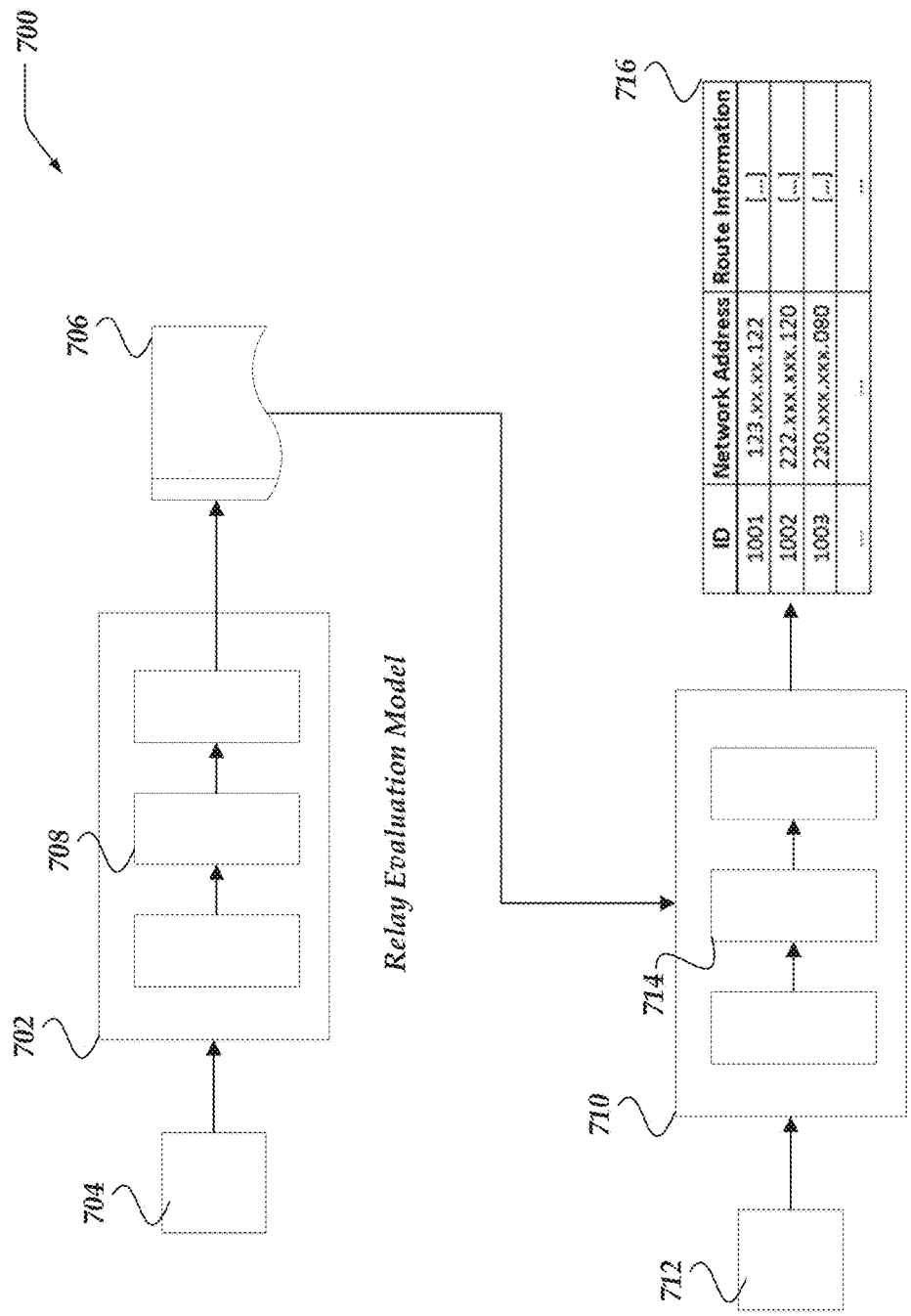
FIG. 7 illustrates a logical schematic of a portion of a management platform engine for relay node management for overlay networks in accordance with one or more of the various embodiments.

FIG. 7 illustrates a logical schematic of a portion of management platform engine 700 for relay node management for overlay networks in accordance with one or more of the various embodiments. As described above, in some embodiments, management platform engines may be arranged to provide relay evaluation models for evaluating the performance of relay computers. Also, in some embodiments, management platform engines may be arranged to provide one or more relay selection models for selecting preferred relay computers or ranking relay computers.

In one or more of the various embodiments, relay evaluation models may be data structures arranged to include one or more heuristics, machine learning classifiers, formulas, conditions, instructions, parameters, state machines, or the like, or combination thereof, that may be employed to determine how to probe or otherwise determine one or more metrics associated with the performance or suitability of relay computers. Accordingly, relay evaluation models may define or execute one or more actions that may be performed to probe relay computers to determine the one or more performance metrics.

In one or more of the various embodiments, gateway computers may be arranged to select relay evaluation models based on the local requirements or local circumstances of organizations for relay node management for overlay networks. Accordingly, in some embodiments, gateway computers may be arranged to employ rules, instructions, or the like, provided by management platform engines or configuration information to select the relay evaluation models for evaluating relay computers.

In some embodiments, gateway computers may be arranged to provide relay evaluation models, such as, relay evaluation model 702 various input information, such as, evaluation input information 704 that may include parameters, user configuration information, detected local system information (e.g., device identity information, user role information, user identity, application identity, or the like), utilization information (e.g., gateway computer utilization, network utilization, or the like), prioritization information, or the like, that may be relevant for evaluating relay computers. In some embodiments, input information 704 may be pre-loaded on a gateway computer or provided by the management platform engine that manages the gateway computer.

Accordingly, in some embodiments, relay evaluation models may include one or more components, represented here by component 708, that include one or more portions of the configuration or instructions for performing relay probe actions.

In some embodiments, relay evaluation models may be arranged to produce probe information, such as, probe information 706. In some embodiments, the information included in probe information may vary depending on the particular types of probes that are performed.

Thus, in some embodiments, relay evaluation models may be configured or modified to collect different metrics, or perform different tests depending on the local requirements or local circumstances associated with a given overlay network, gateway computer, or the like.

Accordingly, in some embodiments, gateway computers may be arranged to periodically execute one or more probe actions and collect one or more metrics for each relay computer that it may be authorized to use.

Also, in one or more of the various embodiments, gateway computers may be arranged to employ relay selection models, such as, relay selection model 710 for determining a preferred relay computers or otherwise rank ordering relay computers based on the probe information.

In one or more of the various embodiments, probe information, such as, probe information 704 as well as selection information, such as, selection information 712 may be provided to relay selection models. In some embodiments, selection information 712 may include information similar to evaluation input information 704.

Similar to relay evaluation models described above, relay selection models may include one or more components, represented here by component 714, that may include one or more portions of configuration, conditions, actions, instructions, or the like, for determining preferred relay computers or rank ordering relay computers based on criteria defined by the relay selection models.

Accordingly, in some embodiments, relay selection model 710 may be arranged to generate relay selection information, such as, relay selection 716, that may include a ranked ordered list of relay computers. Alternatively, in some embodiments, relay selection models may generate preference scores for each relay computer rather than generating a rank ordered list.

In one or more of the various embodiments, relay evaluation models or relay selection models may be combined into the same data structures rather than being separate systems as depicted in this example.

Generalized Operations

FIGS. 8-13 represent the generalized operation for relay node management for overlay networks in accordance with at least one of the various embodiments. In at least one of the various embodiments, processes 800, 900, 1000, 1100, 1200, and 1300 described in conjunction with FIGS. 8-13 may be implemented by or executed on one or more processors of a relay computer, a gateway computer, or a management platform computer, such as network computer 300 of FIG. 3. In other embodiments, these processes, or portions thereof, may be implemented by or executed on one or more processors of a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in at least one of the various embodiments, the processes described in conjunction with FIGS. 8-13 may be used for relay node management for overlay networks with at least one of the various embodiments or architectures such as those described in conjunction with FIGS. 4-7. Further, in at least one of the various embodiments, some or all of the actions performed by processes 800, 900, 1000, 1100, 1200, and 1300 may be executed in part by relay engine 322, management platform engine 324, monitoring engine 326, gateway engine 327, or the like, or combination thereof.

Figure 8:
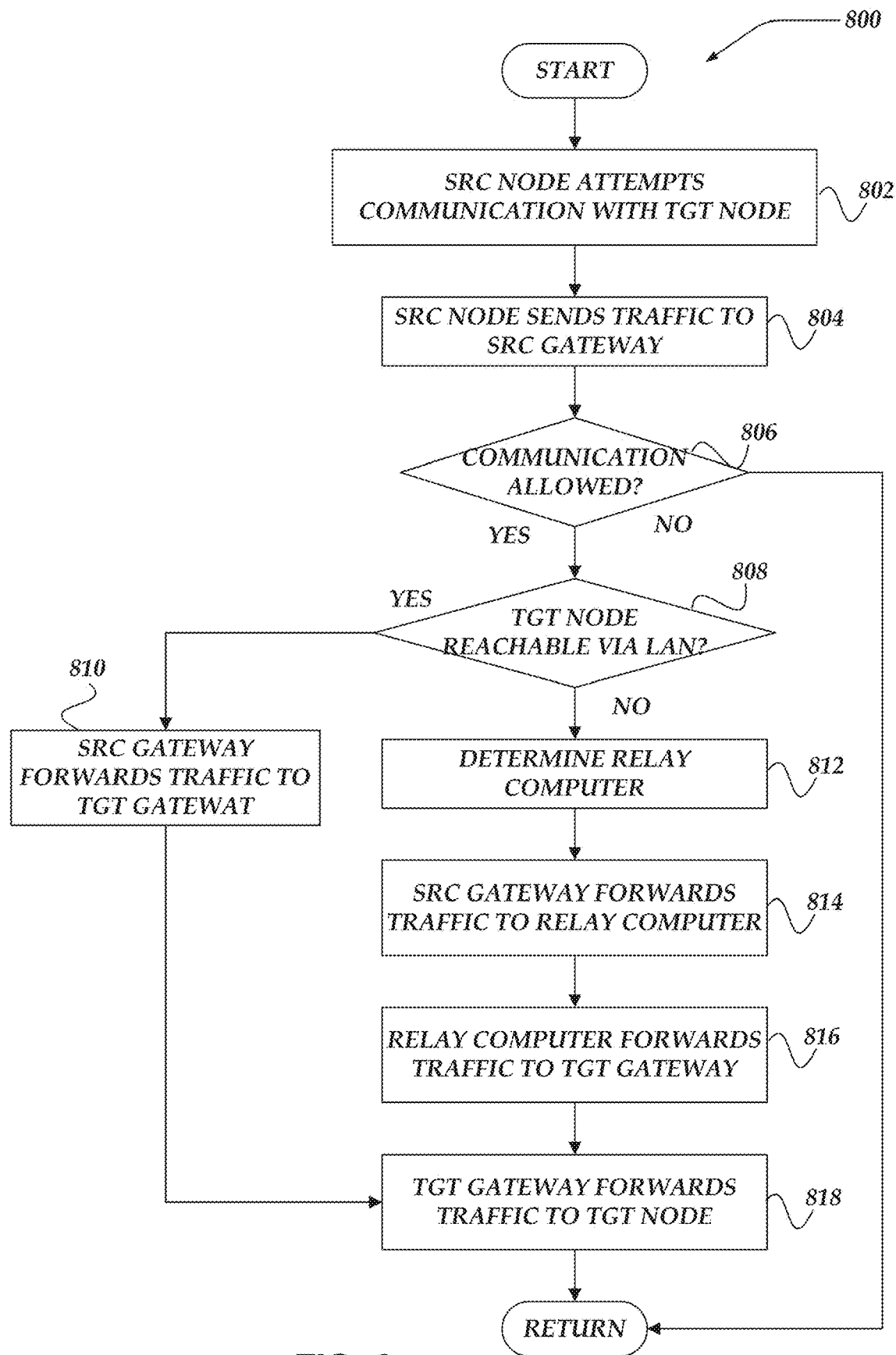
FIG. 8 illustrates an overview flowchart of a process for relay node management for overlay networks in accordance with one or more of the various embodiments.

FIG. 8 illustrates an overview flowchart of process 800 for relay node management for overlay networks in accordance with one or more of the various embodiments. After a start block, at block 802, in one or more of the various embodiments, a source node computer may attempt to communicate with target node computer. As described above, a source node computer may provide overlay traffic that may be directed to a target node computer. As described above, applications or services that may be running on a node computer may initiate communications with another node computer on the overlay network. As described above, applications running on node computers may be configured request or access network communications services provided by the overlay network. In some embodiments, such services may be unaware that they may be using an overlay network. For example, an application running on a node computer may employ conventional network service APIs or protocols absent awareness that the network traffic is being routed or tunneled to its destination via the overlay network.

At block 804, in one or more of the various embodiments, the source node computer may be arranged to send overlay traffic to its gateway computer, the source gateway computer. As described above, in some embodiments, node computers may be arranged to reach the overlay network via a gateway computer. Accordingly, in some embodiments, overlay traffic from a node computer may be provided to its gateway computer to get the overlay traffic onto the overlay network. For brevity and clarity, the node computer sending overlay traffic may be considered the source node computer and its gateway computer may be considered the source gateway computer. Likewise, in some embodiments, the node computer that the source node computer may be sending the overlay traffic to may be considered the target node and its gateway computer may be considered the target gateway computer. Note, a source node computer or source gateway computer may be considered a target node computer or target gateway computer, respectively, if depending on which computer sends the overlay traffic or otherwise has initiated the overlay traffic tunnel.

At decision block 806, in one or more of the various embodiments, if the communication may be allowed by policy enforced by the overlay network, control may flow to decision block 808; otherwise, control may be returned to a calling process. As described above, in some embodiments, management platform engines may be arranged to provide the policy information to gateway computers that may define the overlay network as well as define which nodes on the overlay network may access each other.

Accordingly, in one or more of the various embodiments, the source gateway computer may compare its policy information with the communication from the source node computer to determine if the source node computer can access the target node computer under the current policies in force for the overlay network.

At decision block 808, in one or more of the various embodiments, if the target node may be reachable via the local area network, control may flow to block 810; otherwise, control may flow to block 812. Also, in some embodiments, included in the policy information may be information (route information) that indicates if a relay computer may be needed to establish an overlay traffic tunnel with the target gateway computer or target node computer.

In some embodiments, route information may be included as part of the policy information management platform engines provide to the one or more gateway computers under their management. Accordingly, in some embodiments, the source gateway computer may compare its route information to the overlay network identity of the source node computer and the overlay network identity of the target node computer to determine if a relay computer should be used.

At block 810, in one or more of the various embodiments, the source gateway computer may be arranged to forward the overlay traffic to the target gateway computer over the local area underlay network. In some embodiments, if the portion of the overlay network that connects the source gateway computer and the target gateway computer may be on the same underlay network or otherwise does not require bridging or routing to other underlay networks or underlay network segments, the source gateway computer may forward the overlay traffic to the target gateway computer directly. Next, in one or more of the various embodiments, control may flow to block 818.

At block 812, in one or more of the various embodiments, the source gateway computer may be arranged to determine a relay computer. In some embodiments, if the portion of the overlay network that includes the target gateway computer or target node computer may be unreachable from the local area underlay network, the routing information may include one or more relay computers that may enable the overlay traffic to reach the target gateway computer or target node computer via an overlay traffic tunnel that traverses one or more other underlay networks or wide-area networks (WANs). In some embodiments, if there may be more than one relay computer that enables an overlay traffic tunnel to be established between the source gateway computer and the target gateway computer, one or more of those relay computers may be considered preferred over other one or more relay computers. Accordingly, in some embodiments, the source gateway computer may be arranged to select a preferred relay computer to use for establishing the overlay traffic tunnel with the target gateway computer.

At block 814, in one or more of the various embodiments, the source gateway computer may be arranged to forward overlay traffic to the selected relay computer over the overlay traffic tunnel.

At block 816, in one or more of the various embodiments, the determined relay computer may be arranged to forward the overlay traffic to the target gateway computer associated with the target node. As described above, relay computers may be arranged to establish an overlay traffic tunnel that spans one or more other underlay networks (including WANs) to reach the target gateway computer. Accordingly, if the overlay traffic tunnel to the target gateway computer may be established, the overlay traffic from the source node computer may be forwarded to the target gateway computer.

At block 818, in one or more of the various embodiments, the target gateway computer may be arranged to forward the overlay traffic to the target node. As described above, gateway computers forward overlay traffic to node computers. Accordingly, here, for some embodiments, the target gateway computer may forward the overlay traffic to the target node computer.

Next, in one or more of the various embodiments, control may be returned to a calling process.

Figure 9:
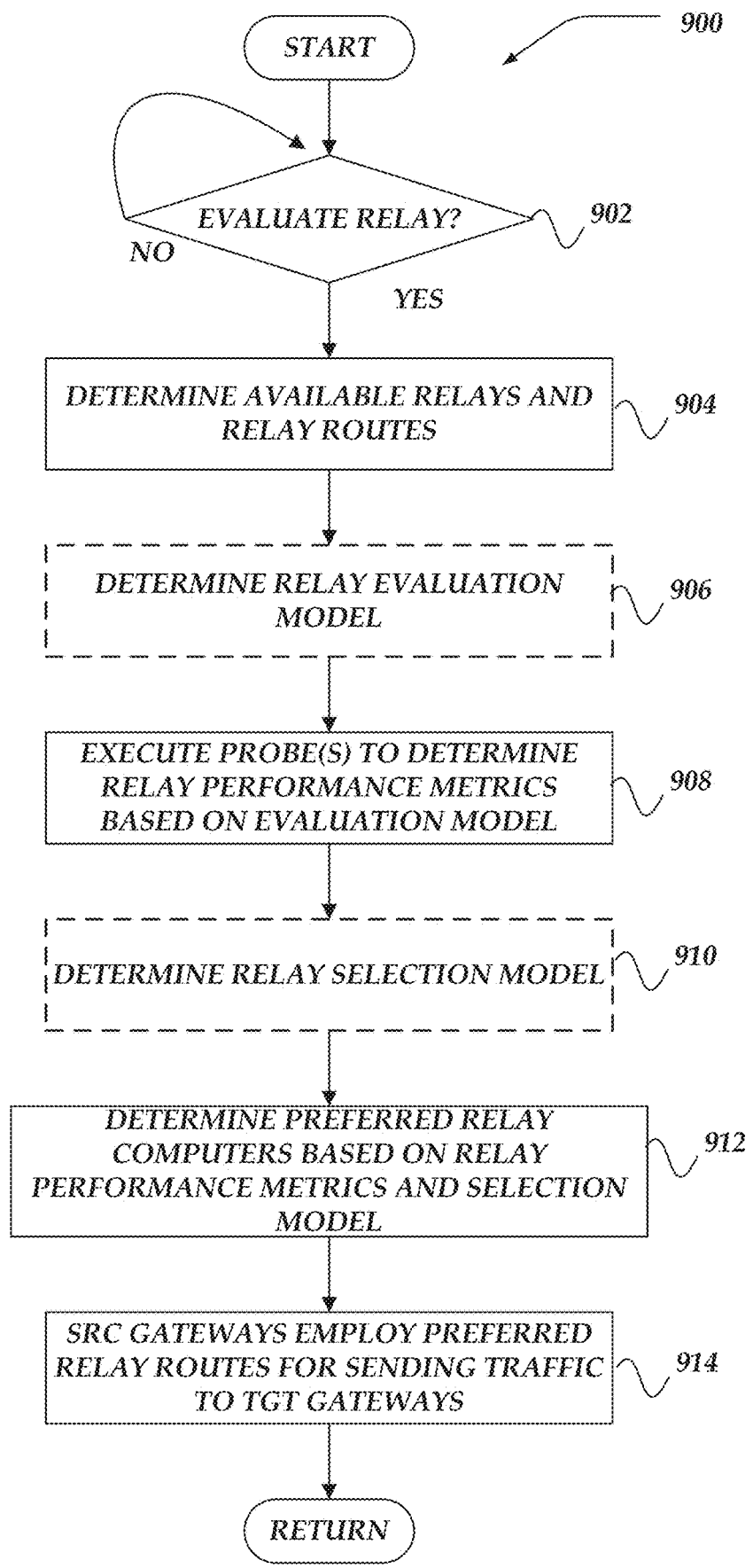
FIG. 9 illustrates a flowchart of a process for determining preferred relay computers for relay node management for overlay networks in accordance with one or more of the various embodiments.

FIG. 9 illustrates a flowchart of process 900 for determining preferred relay computers for relay node management for overlay networks in accordance with one or more of the various embodiments. After a start block, at decision block 902, in one or more of the various embodiments, if a gateway computer may evaluate available relay computers, control may flow to block 904; otherwise, control may loop back to decision block 902. As described above, in some embodiments, gateway computers may be configured to initiate relay computer probing based on defined schedules or conditions. In some embodiments, gateway computers may be arranged to probe one or more different metrics at different intervals. For example, in some embodiments, gateway computers may be configured to probe available relay computers every five minutes. However, in some embodiments, gateway computers may be arranged to probe relay computers based on rules, instructions, conditions, or the like, provided via configuration information provided by its management platform engine to account for local circumstances or local requirements.

In some embodiments, the probe interval may be provided by the relay evaluation model employed by the gateway computer.

At block 904, in one or more of the various embodiments, the gateway computer may determine one or more available relay computers or relay routes. In some embodiments, gateway computers may be arranged to automatically determine the one or more available relay computers or relay routes based on configuration information or policy information that may be provided by its management platform engine. As described above, management platforms engines may be arranged to provide gateway computers overlay network configuration information that includes overlay identities for the node computers or gateway computers in the overlay network. Also, In some embodiments, gateway computers may be provided information about the relay computers that may be employed to reach gateway computers or node computers in different underlay networks (or sub-networks) that may require routing by the underlay network to forward overlay traffic across one or more portions of the underlay network to reach one or more portions of the overlay network.

In some embodiments, management platform engine may provide gateway computer a list of all the GIDs it may reach in the overlay network. Some of the GIDs may be associated with tags or other information that may indicate one or more relay computers may be required to reach them across one or more underlay networks or underlay network segments.

At block 906, in one or more of the various embodiments, optionally, the gateway computer may be arranged to determine a relay evaluation model for evaluating the one or more relay computers. As described above, in some embodiments, gateway computers may be arranged to employ relay evaluation models to execute (or determine) the actions for probing relay computers. In some embodiments, gateway computers may be configured by their management platform engine to employ specific relay evaluation models. In some embodiments, two or more relay evaluation models may be available. Accordingly, in some embodiments, gateway computers may be arranged to employ rules, instructions, or the like, provided by their management platform engine to select which relay evaluation models to use. For example, in some embodiments, one relay evaluation model may be employed for one set of relay computers while another relay evaluation model may be employed for other relay computers.

In one or more of the various embodiments, relay evaluation models may define the one or more metrics to collect/measure, such as, average latency (round trip time to relay computer), number of dropped probes, number of abandoned probes, number of failed probes, geo-location information, relay computer load, or the like. In some embodiments, one or more metrics may require access to other services or APIs that enable a probe to collect information.

Also, in some embodiments, relay computers may include agent processes that may monitor one or more local metrics on the relay computer. Accordingly, in some embodiments, probes may perform actions that include collecting information provided by these agents. For example, in some embodiments, agents may report values for various metrics, such as, running process list, uptime, active users, active or average number of overlay traffic tunnels, or the like.

Further, in some embodiments, agents may enable probes to collect information about the relay computer machine, such as, the number of processors or processor cores, working memory, network interface information, availability of specialized hardware for managing overlay traffic tunnels, the presence or characteristics of hardware accelerating cryptography, or the like.

Note, this block is indicated as being optional because in some embodiments gateway computers may be pre-loaded with default relay evaluation models. Likewise, in some embodiments, management platform engines may be arranged to provide gateway computers with default or mandatory relay evaluation models.

At block 908, in one or more of the various embodiments, the gateway computer may be arranged to execute one or more probes or monitoring actions to determine one or more metrics based on the determined relay evaluation model. In some embodiments, relay computers may be associated with a relay route profile that include one or more fields or attributes that may correspond to one or more of the various metrics discovered by the probing actions. For example, in some embodiments, a relay route profile may include a relay identifier, target gateway identifier, last probed time, round trip time, or the like. In some embodiments, relay route profiles may be dynamically expanded based on the type of probe actions defined in the relay evaluation model being used.

At block 910, in one or more of the various embodiments, optionally, the gateway computer may be arranged to determine a relay selection model for selecting a preferred relay computer. Similar to relay evaluation models, gateway computers may be enabled to select from two or more relay selection models.

In one or more of the various embodiments, relay selection models may define rules for determining if one relay computer should be preferred over another based on the metrics collected by the probing. In some embodiments, relay selection models may be arranged to generate a single score based on a linear combination of one or more metrics. In some embodiments, relay selection models may assign different weights to different metrics. Likewise, in some embodiments, relay selection models may be arranged to disregard one or more metrics.

In some embodiments, relay selection models may be arranged to include filters or other non-linear/discrete/discontinuous formulas to score relay computers. For example, for some embodiments, relay selection models may map one or more continuous values to discrete representations, such as, high, medium, low, or the like. Also, in some cases, continuous or discrete values may be mapped to Boolean (true/false) values, or the like.

Note, this block is indicated as being optional because in some embodiments gateway computers may be pre-loaded with a default or mandatory relay selection models. Likewise, in some embodiments, management platform engines may be arranged to provide gateway computers with default or mandatory relay selection models.

At block 912, in one or more of the various embodiments, the gateway computer may be arranged to determine one or more preferred relay computers or relay routes based on the relay metrics or the relay selection model. In some embodiments, gateway computers may be arranged to employ the scores/scoring generated by the relay selection models to ranks or otherwise a preferred relay computer. In some embodiments, the relay selection models may provide a rank ordered list of relay computers based on the scoring.

At block 914, in one or more of the various embodiments, the source gateway computer may be arranged to employ the preferred relay computer or relay routes to forward overlay traffic to one or more target gateway computers.

Next, in one or more of the various embodiments, control may be returned to a calling process.

Figure 10:
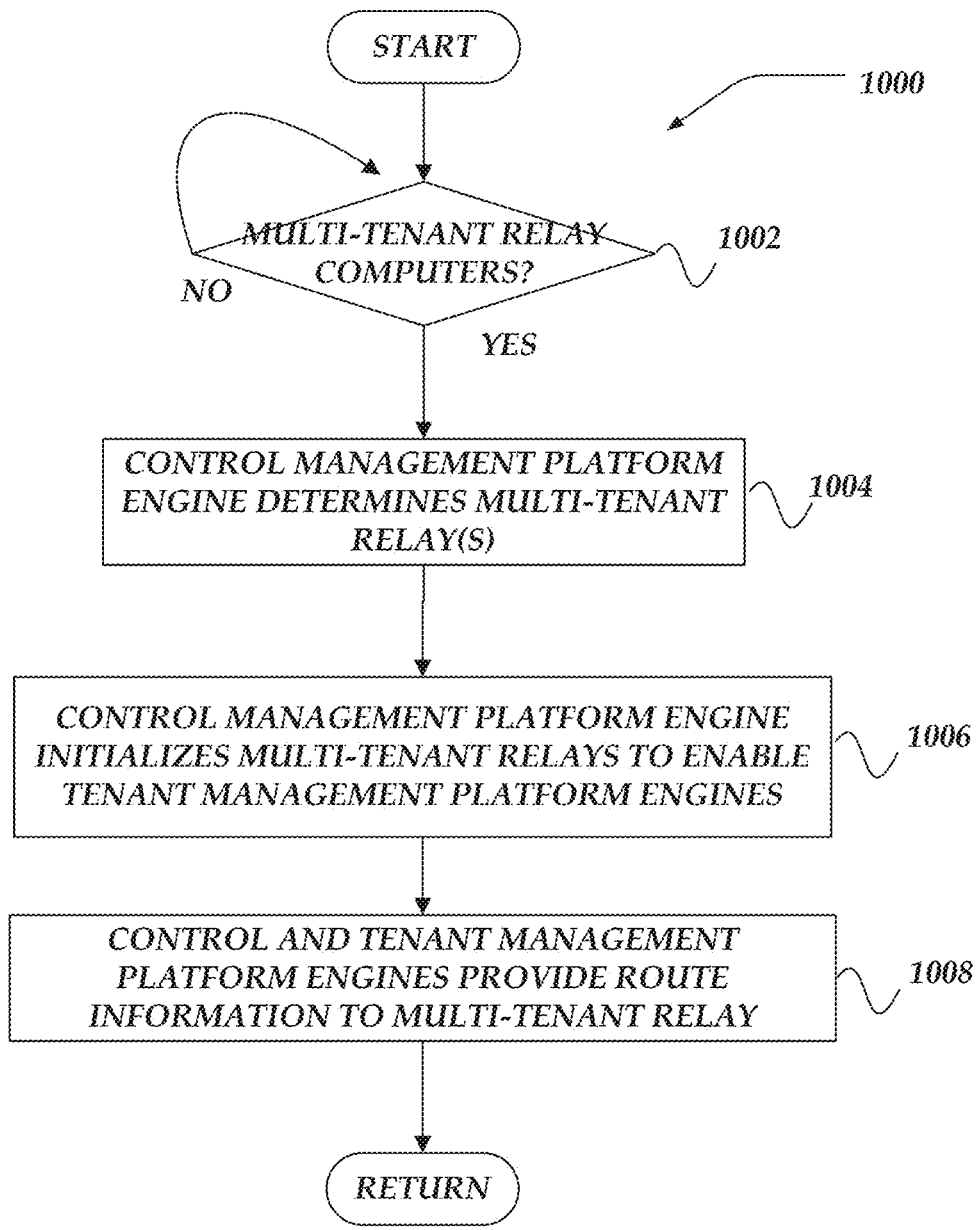
FIG. 10 illustrates a flowchart of a process for determining multi-tenant relay computers for relay node management for overlay networks in accordance with one or more of the various embodiments.

FIG. 10 illustrates a flowchart of process 1000 for determining multi-tenant relay computers for relay node management for overlay networks in accordance with one or more of the various embodiments. After a start block, at decision block 1002, in one or more of the various embodiments, if multi-tenant relay computers may be available, control may flow to block 1004; otherwise, control may loop back to block 1002. In one or more of the various embodiments, relay computers may be configured to support multiple tenants. In this context, in some embodiments, tenants may be considered organizations or users that employ separate management platform engines to manage independent overlay networks.

Accordingly, in some embodiments, relay computers may be enabled to relay overlay traffic for more than one organization or more than one overlay network. In contrast, in some embodiments, a relay computer that may not be enabled to support multiple tenants may support one overlay network managed by one management platform engine.

In one or more of the various embodiments, if one or more relay computers may be enabled to support multiple tenants additional actions may be performed to configure or initialize the one or more relay computers that support multiple tenants.

At block 1004, in one or more of the various embodiments, a control management platform engine may be arranged to determine one or more multi-tenant relay computers.

In one or more of the various embodiments, control management platform engines may be arranged to manage the configuration of relay computers shared with more than one tenant. Accordingly, in one or more of the various embodiments, control management platform engines may be arranged to employ configuration information to identify which relay computers may be configured for multi-tenant operations. In some embodiments, control management platform engines may provide a list of relay computer identifiers that correspond to multi-tenant relay computers. In some embodiments, all relay computers may default to supporting multiple tenants. Also, in some embodiments, one or more relay computers from among a group of known relay computers may be configured to support multi-tenant operations.

In some embodiments, each multi-tenant relay computer may be associated with a control management platform engine. In some embodiments, there may be more than one multi-tenant relay computers such that one or more may have different control management platform engines. In some embodiments, some or all relay computers configured to support multiple tenants may not have tenants. Note, in some embodiments, a control management platform engine may be associated with a single relay computer that is not hosting tenants. In such circumstances, in some embodiments, the control management platform engine and its associated multi-tenant relay computer may operate similarly to a "normal" management platform engine and relay computer that may not support multiple tenants.

At block 1006, in one or more of the various embodiments, the control management platform engine may be arranged to initialize the one or more multi-tenant relay computers. In some embodiments, the initialization process may include configuring its multi-tenant relay computers to allow one or more particular tenant management platform engines access to the multi-tenant relay computers.

In one or more of the various embodiments, control management platform engines may register or otherwise authorize one or more tenant management platform engines to access the managed multi-tenant relay computers. In some embodiments, control management platform engines may provide policy information that enables or disables one or more tenant management platforms access to one or more multi-tenant relay computers.

In one or more of the various embodiments, policy information may include rules, instructions, conditions, or the like, that may limit or restrict the amount of resources tenant management platform engine may be allowed to consume. In some embodiments, control management platform engines may enable different tenant management platform engines to have different resource consumption limits. In some embodiments, control management platform engines may be arranged to grant one or more tenant management platform engines higher priority over others. Thus, in some embodiments, control management platform engines may enforce quality of service (QoS) requirements or restrictions.

In one or more of the various embodiments, control management platform engines may be arranged to send a notification or otherwise engage in a handshake process to collect credential information from tenant management platform engines. In some embodiments, the collected credential information may be employed to authorize the tenant management platform engines with multi-tenant relay computers. For example, in some embodiments, control management platform engines may be arranged to collect one or more cryptographic keys, cryptographic certificates, or the like, that may be installed on its managed multi-tenant relay computers to enable the tenant management platform engines to authenticate themselves with the multi-tenant relay computers. In some embodiments, control management platform engines and tenant management platform engines may be arranged to employ conventional secure protocols over the underlay network to exchange information that the control management platform engine may employ to register tenant management platform engines with multi-tenant relay computers.

Further, in one or more of the various embodiments, control management platform engines enabled to register tenant management platform engines with its multi-tenant relay computers may be disabled from discovering information about the tenant overlay networks that the tenant management platform engines may manage. Likewise, in some embodiments, if a control management platform engine has its own overlay network that it manages, the tenant management platform engines may be disabled from seeing or accessing that overlay network as well.

At block 1008, in one or more of the various embodiments, the control management platform engine and the one or more tenant management platform engines may be arranged to provide route information to the multi-tenant relay computer. In one or more of the various embodiments, authorized tenant management platform engines may be arranged to register with multi-tenant relay computers similar to how they register with single organization relay computers. In some embodiments, tenant management platform engines may be unaware if a relay computer supports multiple tenants. For example, in some embodiments, a control management platform engine may register a tenant management platform engine with multi-tenant relay computers without interaction or direction from the tenant management platform engines.

However, in some embodiments, if a tenant management platform engine attempts to update a multi-tenant relay computer with its routing information, the multi-tenant relay computer may authenticate the tenant management platform using authentication information provided to it by its control management platform engine.

In some embodiments, control management platform engines cannot "see" the overlay networks associated with tenant management platform engines, accordingly, the control management platform engine may be disabled from enforcing policy on individual overlay networks except for resources quotas, or the like.

In contrast, in some embodiments, tenant management platform engines may provide the multi-tenant relay computers policy information that may be employed to manage overlay traffic or overlay traffic tunnel policies for the overlay networks they manage.

Accordingly, in one or more of the various embodiments, if a tenant management platform engine registers with a multi-tenant relay computer, it may provide configuration information to its tenant gateway computers that enable the tenant gateway computer to access the multi-tenant relay computers similar to how single organization relay computers may be used. Note, in one or more of the various embodiments, the tenant gateway computers themselves may be unknown or otherwise inaccessible to the control management platform engine or other tenant management platform engines.

Further, in some embodiments, multi-tenant relay computers may be arranged to prevent overlay traffic inspection, overlay traffic proxying, or the like. Thus, in some embodiments, the overlay traffic for different tenants may be opaque to the multi-tenant relay computer, the control management platform engine, or other tenant management platform engines.

Next, in one or more of the various embodiments, control may be returned to a calling process.

Figure 11:
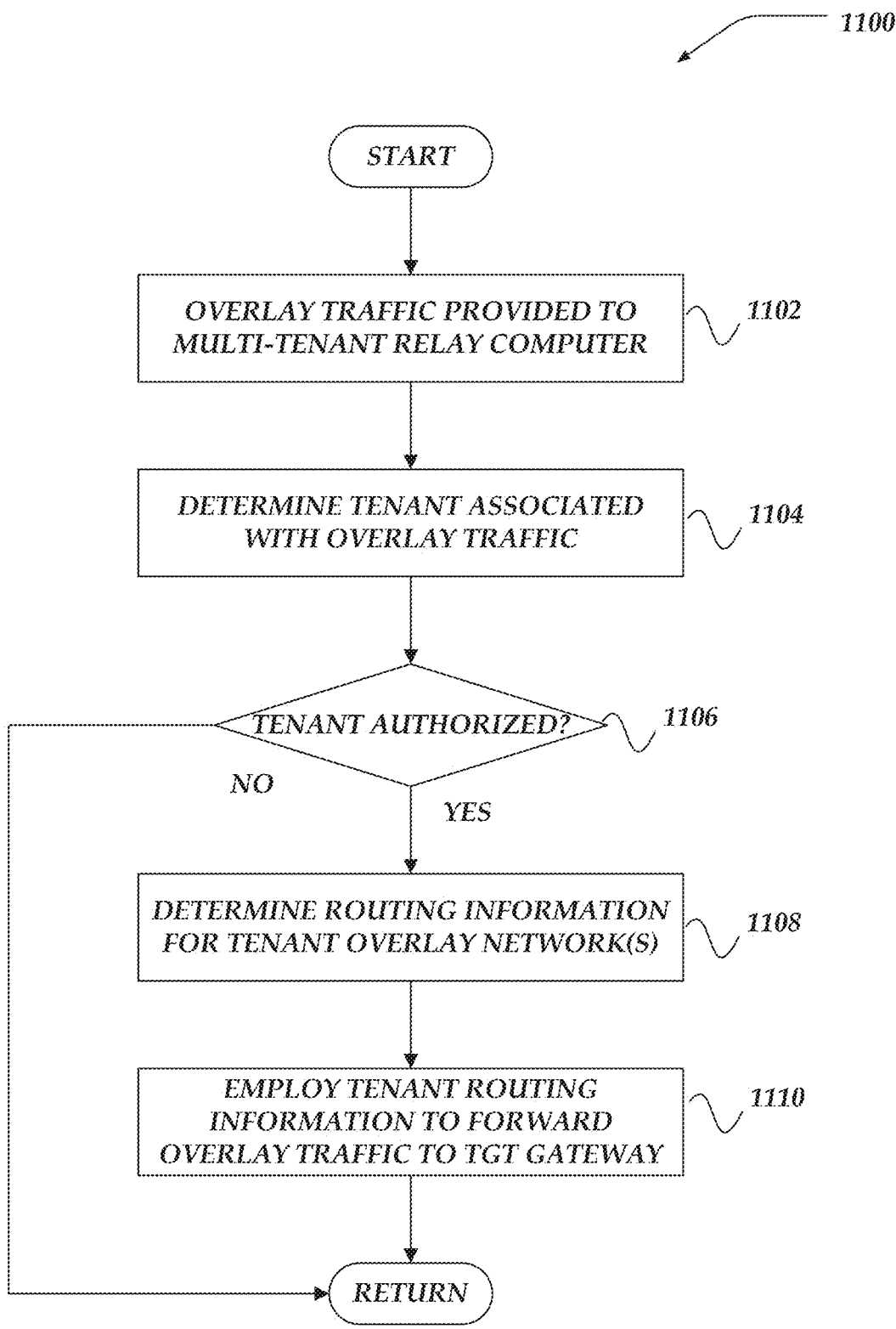
FIG. 11 illustrates a flowchart of a process for routing overlay traffic using multi-tenant relay computers for relay node management for overlay networks in accordance with one or more of the various embodiments.

FIG. 11 illustrates a flowchart of process 1100 for routing overlay traffic using multi-tenant relay computers for relay node management for overlay networks in accordance with one or more of the various embodiments. After a start block, at block 1102, in one or more of the various embodiments, overlay traffic may be provided to a multi-tenant relay computer. As described above, in some embodiments, relay computers may be configured to operate in multi-tenant mode such that two or more different/unrelated organizations using different/unrelated overlay networks may share one or more of the same relay computers. Accordingly, as described above, in some embodiments, a control management platform engine may be arranged to provide configuration information to relay computers that may authorize one or more tenant management platform engines to provide configuration information or policy information to a shared multi-tenant relay computer.

Thus, in one or more of the various embodiments, some or all of the overlay traffic provided to a relay computer may be associated tenant overlay traffic from two or more tenants that may share the same relay computer.

At block 1104, in one or more of the various embodiments, the relay computer may be arranged to determine which tenant may be associated with the overlay traffic. In one or more of the various embodiments, relay computer may be arranged to examine one or more characteristics of incoming overlay traffic to determine its source. In some embodiments, relay computers may be arranged to examine various features of the incoming overlay traffic to determine the tenant associated with the overlay traffic, such as, underlay network addresses information (e.g., IP addresses, VLAN identifiers, or the like), overlay network identities, or the like.

In one or more of the various embodiments, overlay network identities that may correspond to node computers or gateway computers in an overlay network may be partitioned into different namespaces. In some embodiments, relay computers may be arranged to mask or filter the overlay network identity information included in the overlay traffic to determine the tenant that the overlay traffic may be associated with.

As described above, relay computers may be arranged to maintain separate routing information for the tenants that may be authorized to access a given relay computer. Accordingly, in some embodiments, relay computers may be arranged to employ the overlay network identities associated with incoming overlay traffic to determine the routing or policy information associated with the incoming overlay traffic.

Further, in some embodiments, multi-tenant relay computers may be arranged to apply relay policy provided by the tenant management platform engines to overlay traffic associated with the tenant gateway computers. For example, in some embodiments, a tenant management platform engine may be configured to restrict one or more of its managed gateway computers or node computers from using a particular shared relay computer.

Likewise, in some embodiments, the control management platform engine responsible for coordinating tenant access to the shared relay computer may provide configuration information or policy information that may restrict or enable certain tenant gateway computers, tenant node computers, tenant applications, tenant users, or the like, from accessing one or more shared relay computers. Further, in some embodiments, tenant access to shared relay computers may depend on licensing agreements, usage quotas, QoS agreements, or the like, between the tenants and the host organization. For example, in some embodiments, service level agreements may prioritize overlay traffic associated with one tenant over overlay traffic associated with another tenant. Thus, in this example, for some embodiments, one or more tenants may be barred from using a particular shared relay computer if handling that overlay traffic may cause the service quality of another tenant to degrade below a guaranteed quality level.

At decision block 1106, in one or more of the various embodiments, if the tenant may be authorized to employ the multi-tenant relay computer, control may flow to block 1108; otherwise, control may be returned to a calling process. Also, as described above, in some embodiments, access to the shared relay computer may depend on one or more other metrics or characteristics associated with the tenant overlay traffic.

At block 1108, in one or more of the various embodiments, the multi-tenant relay computer may be arranged to determine the routing information for the overlay traffic network that may be associated with the tenant associated with the overlay traffic. In one or more of the various embodiments, the shared relay computer may be arranged to employ the routing information or policy information provided via the tenant management platform engine to provide an overlay traffic to the tenant target gateway computer.

In some embodiments, shared relay computers may be arranged to forward the overlay traffic absent the ability to decrypt or inspect the overlay traffic. For example, in some embodiments, overlay traffic for different tenants may be encrypted using cryptographic keys that may be unavailable to the shared relay computer. Thus, in some embodiments, if the shared relay computer may be compromised, attempts to access the tenant overlay traffic of the various tenants may be disabled because the cryptographic information necessary for decrypting the tenant overlay traffic is not available or otherwise stored at the shared relay computer. Also, for example, if a defect in the shared relay computer or a administration/configuration error causes overlay traffic from one or more tenants to be leaked or shared with other tenants, the contents of the inadvertently leaked or shared overlay traffic may remain secure/encrypted because to cryptographic information required to decrypt the leaked or shared overlay traffic may be unavailable to the other tenants that may receive the inadvertently leaked or shared overlay traffic.

At block 1110, in one or more of the various embodiments, the multi-tenant relay computer may be arranged to employ the determined tenant routing information to forward the overlay traffic to the target gateway computer.

Next, in one or more of the various embodiments, control may be returned to a calling process.

Figure 12:
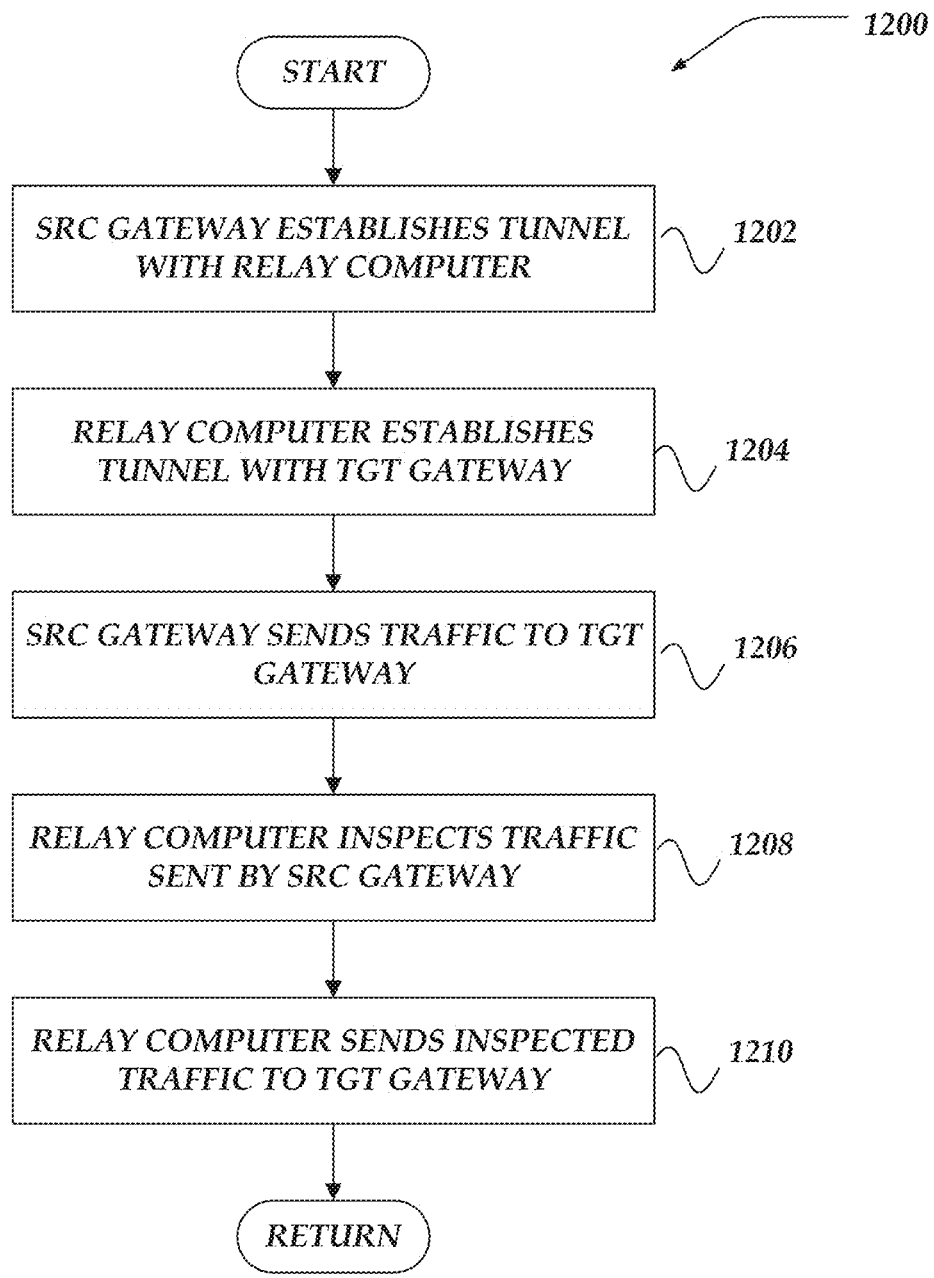
FIG. 12 illustrates a flowchart of a process for inspecting overlay traffic using relay computers for relay node management for overlay networks in accordance with one or more of the various embodiments.

FIG. 12 illustrates a flowchart of process 1200 for inspecting overlay traffic using relay computers for relay node management for overlay networks in accordance with one or more of the various embodiments. After a start block, at block 1202, in one or more of the various embodiments, a source gateway computer may be arranged to establish an overlay traffic tunnel with a relay computer. In one or more of the various embodiments, relay computers may be arranged to operate in a proxy mode rather than exclusively in a passive/pass-through mode.

Accordingly, in one or more of the various embodiments, relay computers may be arranged to establish overlay traffic tunnels that have one endpoint at a gateway computer and the other endpoint at the relay computer.

In one or more of the various embodiments, the relay computer may be arranged to employ configuration information provided by a management platform engine to determine how to provide overlay traffic handshake information that enables the relay computer to appear as the target gateway computer that the source gateway computer may be trying to reach. In some embodiments, relay computers may be arranged to secretly or transparently become a terminal endpoint of a overlay traffic tunnel that extends to the source gateway computer.

Similarly, in one or more of the various embodiments, the relay computer may be arranged to establish an overlay traffic tunnel with the target gateway computer. In some embodiments, the relay computer may employ configuration information provided by management platform engines or information provided during the overlay protocol handshake used to establish the overlay traffic tunnel with the source gateway computer. In one or more of the various embodiments, management platform engines may be arranged to provide credential information, cryptographic secrets (e.g., keys, certificates, or the like), gateway computer identity information, or the like, to relay computers that may be authorized to establish overlay traffic tunnel endpoints with gateway computers.

In one or more of the various embodiments, management platform engines may be configured to selectively authorize relay computers to operate in endpoint/proxy mode. Also, in some embodiments, management platform engines may be arranged to authorize one or more relay computers to proxy one or more specific gateway computers rather than authorizing the one or more relay computers to proxy any gateway computer in the overlay network. Further, in some embodiments, activating or authorizing proxy mode may be enabled or restricted based on various characteristics associated with the overlay traffic, such as, the user sending the overlay traffic, the application associated with the overlay traffic, the source node computer associated with the overlay traffic, the source gateway computer associated with the overlay traffic, the target gateway computer associated with the overlay traffic, the target node computer associated with the overlay traffic, date/time of the communication session, or the like. Accordingly, in one or more of the various embodiments, policy information used for determining if a relay computer should operate in proxy mode may be determined based on configuration information to account for local requirements or local circumstances.

At block 1204, in one or more of the various embodiments, the relay computer may be arranged to establish a overlay traffic tunnel with the target gateway computer associated with the overlay traffic provided by the source gateway computer. Similar to establishing an overlay traffic tunnel endpoint with the source gateway computer, the relay computer may be arranged to establish an overlay traffic with the target gateway computer. In one or more of the various embodiments, the relay computers may employ information determined from the overlay protocol handshake with the source gateway computer to conduct a overlay protocol handshake with the target gateway computer.

Accordingly, in some embodiments, the target gateway computer may operate as if it is establishing an overlay traffic tunnel directly with the source gateway computer.

Note, in some embodiments, relay computers may be configured to openly establish one or more of the overlay traffic tunnel endpoints such that one or more of the source gateway computers or target gateway computers may be provided notice that the relay computer may be intervening in the communication session rather than simply passing the overlay traffic through to the target gateway computers. Accordingly, in some embodiments relay computers may be arranged to provide a notification to one or more of the gateway computers that the relay computer is providing one end of the overlay traffic tunnel. Alternatively, in some embodiments, relay computers may silently operate as a proxy (endpoint) masquerading as one or more of the source gateway computers or the target gateway computer.

At block 1206, in one or more of the various embodiments, the source gateway computer may be arranged to send overlay traffic to the relay computer over the overlay traffic tunnel. In one or more of the various embodiments, if the overlay traffic tunnel between the source gateway computer and the relay computer has been established, the source gateway computer may send the overlay traffic to the relay computer. Note, in some embodiments, the overlay traffic may be directed to the target gateway computer with the relay computer intercepting the overlay traffic and masquerading as the target gateway computer.

At block 1208, in one or more of the various embodiments, the relay computer may be arranged to inspect one or more portions of the overlay traffic sent by the source gateway computer. In one or more of the various embodiments, relay computers masquerading as the source gateway computer may be arranged to inspect one or more portions of the overlay traffic sent by the target gateway computer.

In one or more of the various embodiments, relay computers may be arranged to inspect various parts of the overlay traffic, such as, overlay traffic header information, payload information, or the like. Also, in one or more of the various embodiments, relay computers may be arranged to inspect the some or all of the contents of the underlay network traffic that may be transporting the overlay traffic.

In one or more of the various embodiments, if a relay computer may be provided sufficient security/cryptographic information, such as, pass phrases, passwords, keys, secrets, certificates, or the like, the relay computer may be arranged to decrypt the all of the overlay traffic. However, in some embodiments, relay computers may be provided limited information that enables limited decryption or inspection of the overlay traffic.

In some embodiments, the overlay traffic may include application payloads that may be encrypted independently from the overlay traffic itself. Accordingly, in some embodiments, relay computers may require additional credentials or information to decrypt some or all of the application payloads that may be carried in the overlay traffic.

In some embodiments, relay computers may be arranged to provide some or all of the decrypted overlay traffic to another service to inspect the network traffic. Also, in some embodiments, relay computers may be arranged to employ an onboard monitoring engine (e.g., monitoring engine 326) to inspect some or all of the overlay traffic.

Further, in one or more of the various embodiments, relay computers may be arranged to issue one or more notifications, if the inspected overlay traffic matches one or more conditions.

In some embodiments, relay computers may employ filters, rules, threshold values, pattern matching, or the like provided via configuration information to determine the specific inspection actions or inspection notification to perform.

At block 1210, in one or more of the various embodiments, the relay computer may be arranged to send the overlay traffic sent by the source gateway computer to the target gateway computer over the overlay traffic tunnel. In some embodiments, in some cases, the inspection of the overlay traffic may indicate that the overlay traffic should not sent to the target gateway computer. For example, if the inspection of the overlay traffic trips an alarm or otherwise violates an overlay network policy, the relay computers may be arranged to suspend the communication session and raise an alarm. Note, in some embodiments, relay computers may be arranged to determine a response to security violations based on overlay network policies provided by its management platform engine or other configuration information sources to account for local requirements or local circumstances.

Next, in one or more of the various embodiments, control may be returned to a calling process.

Figure 13:
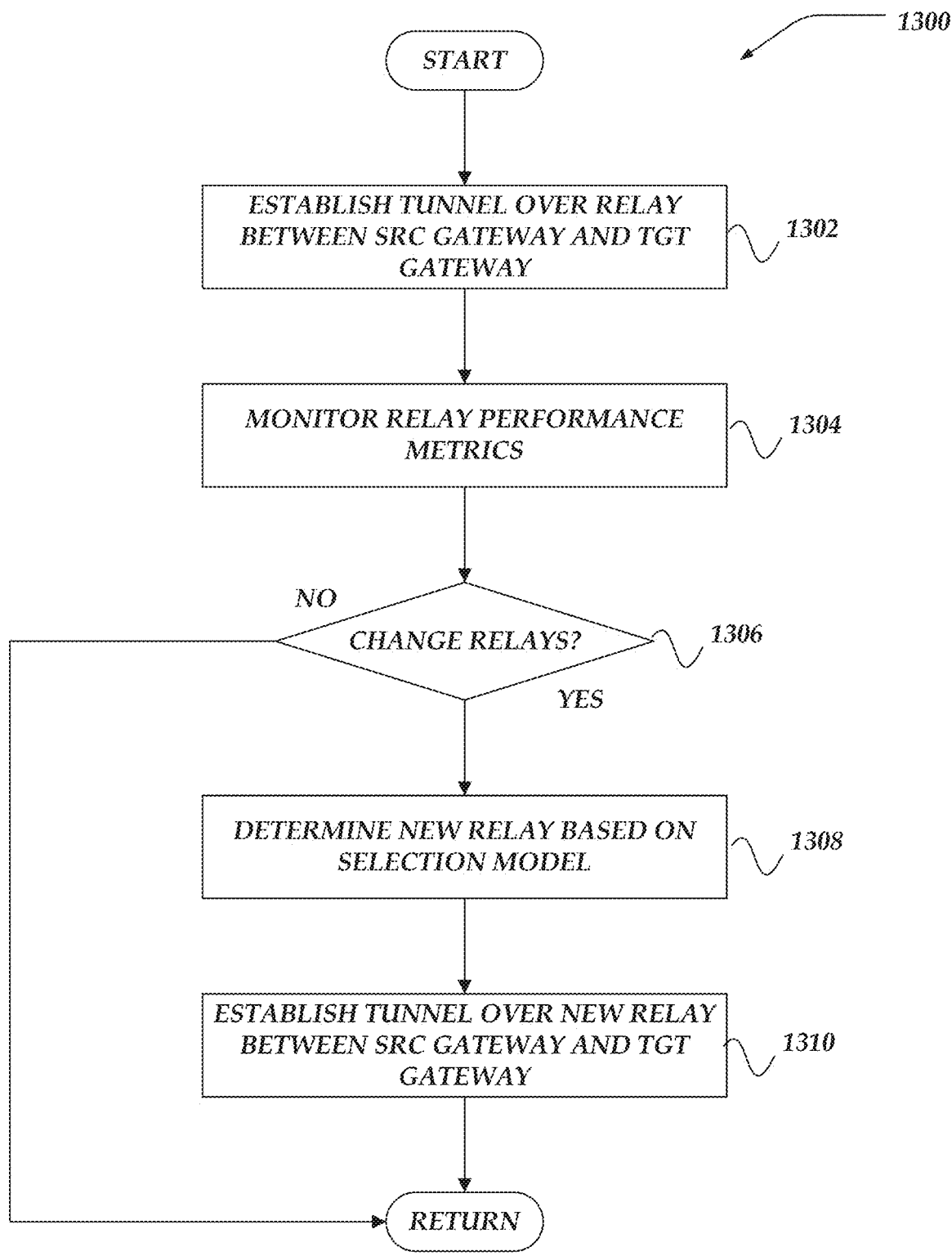
FIG. 13 illustrates a flowchart of a process for changing relay computers mid-session for relay node management for overlay networks in accordance with one or more of the various embodiments.

FIG. 13 illustrates a flowchart of process 1300 for changing relay computers mid-session for relay node management for overlay networks in accordance with one or more of the various embodiments. After a start block, at block 1302, in one or more of the various embodiments, an overlay traffic tunnel from a source gateway computer via a relay computer to a target gateway computer. As described above, if a source gateway computer may be sending overlay traffic directed to a target node computer on behalf of a target node computer to a target gateway computer, an overlay traffic tunnel may be established via the relay computer from the source gateway computer to the target gateway computer.

As described above, if more than one relay computer may be available to provide the tunnel to the target gateway computer, the source gateway computer may employ the relay computer determined to be preferred for reaching the target gateway computer.

At block 1304, in one or more of the various embodiments, the source gateway computer may be arranged to monitor relay computer performance metrics. In some embodiments, the specific monitoring activity may be determined based on a relay evaluation model. In one or more of the various embodiments, even though an overlay traffic tunnel has been established for a pending communication session, the source gateway computer may be arranged to continue monitoring relay computer metrics based on its relay evaluation models. Accordingly, in some embodiments, the source gateway computer may be arranged to employ its relay selection models to dynamically rank order the two or more relay computers that may be available for providing the pending overlay traffic tunnel.

Also, in some embodiments, gateway computers may be arranged to monitor the performance of the communication session itself to collect metrics associated with the relay computer. For example, in some embodiments, the source gateway computer may be arranged to monitor send/receive rates, latency, dropped packets, connection resets, or the like, that may be associated with the overlay traffic during the communication session.

At decision block 1306, in one or more of the various embodiments, if the monitoring indicates that different relay computer may be selected or preferred, control may flow block 1308; otherwise, control may be returned to a calling process. As described above, relay selection models may be employed to rank relay computers or otherwise identify preferred relay computers for reaching a given target gateway computer.

Also, in some embodiments, local endpoint information available to the source gateway computer may be employed to determine if the overlay traffic tunnel should be changed to use a different overlay traffic tunnel. For example, if the current relay computer disappears from the network or otherwise becomes available, the source gateway computer may detect that the communication has unexpectedly terminated. In some embodiments, gateway computer may be arranged to automatically begin using the next preferred relay computer. Alternatively, in some embodiments, gateway computer may be arranged to automatically initiate relay computer probing to identify another/different preferred relay computer.

Also, in one or more of the various embodiments, management platform engines may be arranged to initiate a new round of relay computer probing by sending a control message to one or more of its managed source gateway computers. For example, the management platform engine may be arranged to bring down a relay computer as part of a scheduled maintenance policy or for administrative intervention.

At block 1308, in one or more of the various embodiments, the source gateway computer may be arranged to determine a new preferred relay computer based on a relay selection model. As described above, in some embodiments, gateway computers may rank two or more relay computers or otherwise determine a relay that may be preferred relay computer for establishing an overlay traffic tunnel with a given target gateway computer.

At block 1310, in one or more of the various embodiments, the source gateway computer may be arranged to establish a new overlay traffic tunnel over the new preferred relay computer to the target gateway computer.

Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing communication over a network using one or more network computers that include one or more processors that perform actions, comprising:
   determining a gateway identifier (GID), a network address, one or more source nodes, and two or more relays based on an overlay network, wherein the GID is based on the overlay network and the network address is based on a first underlay network;
   determining a target GID of a target gateway in a second underlay network based on the overlay network;
   ranking the two or more relays based on one or more metrics associated with each relay, wherein a top ranked relay is designated as a preferred relay; and
   in response to a source node providing overlay traffic directed to a target node associated with the target GID, performing further actions, including:
      employing the first underlay network to provide network traffic that includes the overlay traffic to the preferred relay, wherein the preferred relay determines a target network address in the second underlay network based on the target GID, and wherein the preferred relay employs the target network address to provide the network traffic to the target gateway, and wherein the target gateway provides the overlay traffic to the target node;
      determining one or more updated metrics associated with the two or more relays;
      re-ranking the two or more relays based on the one or more updated metrics; and
      in response to another relay exceeding the rank of the preferred relay, designating the other relay as a new preferred relay, wherein the new preferred relay employs the second underlay network to provide the network traffic to the target gateway.

2. The method of claim 1, further comprising:
   determining a relay evaluation model based on the overlay network; and
   determining one or more actions for determining the one or more metrics based on the relay evaluation model, wherein the one or more actions included one or more of pinging the two or more relays over the underlay network, measuring a latency value for the two or more relays, underlay network utilization of the one or more relays, processors load of the two or more relays, average number of underlay network connections to the two or more relays, average number of overlay traffic tunnels that are active in the two or more relays, or geographic distance to the two or more relays.

3. The method of claim 1, wherein employing the first underlay network to provide the network traffic that includes the overlay traffic to the preferred relay, further comprises:
   establishing an overlay traffic tunnel that encrypts the overlay traffic, wherein the overlay traffic is opaque to preferred relay; and
   extending the overlay traffic tunnel to the target gateway over the second underlay network, wherein the target gateway is enabled to decrypt the overlay traffic and forward it to the target node.

4. The method of claim 1, further comprising:
   establishing a first overlay traffic tunnel to the preferred relay, wherein the first overlay tunnel is terminated at the preferred relay, and wherein the overlay traffic is provided to the preferred relay over the overlay traffic tunnel;
   establishing a second overlay traffic tunnel from the preferred relay to the target gateway; and
   employing the preferred relay to inspect the overlay traffic provided by the first overlay traffic tunnel before forwarding the overlay traffic to the second overlay traffic tunnel.

5. The method of claim 1, wherein ranking the two or more relays based on the one or more metrics associated with each relay, further comprises:
   determining a relay selection model based on the overlay network; and
   determining a preference score for the two or more relays based on the relay selection model, wherein the relay selection model performs one or more actions for ranking the two or more relays, including one or more of, weighting the one or more metrics, or disqualifying one or more relays based on the one or more metric exceeding threshold value.

6. The method of claim 1, further comprising:
   determining a value of the GID that is restricted to an upper bound value and a lower bound value, wherein the upper bound value and the lower bound value provide a namespace for a plurality of GIDs that are in the same overlay network, wherein one or more GIDs values that are outside of the upper bound value and the lower bound value are associated with one or more different overlay networks.

7. The method of claim 1, further comprising:
   providing two or more agents that are hosted on the two or more relays; and
   collecting a portion of one or more metrics from the two or more agents, wherein the portion of the one or more metrics, include one or more of process count, memory load, number of users, number of active overlay traffic tunnels, or list of active applications.

8. A network computer for managing communication over one or more networks, comprising:
   a memory that stores at least instructions; and
   one or more processors that execute instructions that perform actions, including:
      determining a gateway identifier (GID), a network address, one or more source nodes, and two or more relays based on an overlay network, wherein the GID is based on the overlay network and the network address is based on a first underlay network;

determining a target GID of a target gateway in a second underlay network based on the overlay network;

ranking the two or more relays based on one or more metrics associated with each relay, wherein a top ranked relay is designated as a preferred relay; and in response to a source node providing overlay traffic directed to a target node associated with the target GID, performing further actions, including:

employing the first underlay network to provide network traffic that includes the overlay traffic to the preferred relay, wherein the preferred relay determines a target network address in the second underlay network based on the target GID, and wherein the preferred relay employs the target network address to provide the network traffic to the target gateway, and wherein the target gateway provides the overlay traffic to the target node;

determining one or more updated metrics associated with the two or more relays;

re-ranking the two or more relays based on the one or more updated metrics; and in response to another relay exceeding the rank of the preferred relay, designating the other relay as a new preferred relay, wherein the new preferred relay employs the second underlay network to provide the network traffic to the target gateway.

9. The network computer of claim 8, further comprising:

determining a relay evaluation model based on the overlay network; and determining one or more actions for determining the one or more metrics based on the relay evaluation model, wherein the one or more actions included one or more of pinging the two or more relays over the underlay network, measuring a latency value for the two or more relays, underlay network utilization of the one or more relays, processors load of the two or more relays, average number of underlay network connections to the two or more relays, average number of overlay traffic tunnels that are active in the two or more relays, or geographic distance to the two or more relays.

10. The network computer of claim 8, wherein employing the first underlay network to provide the network traffic that includes the overlay traffic to the preferred relay, further comprises:

establishing an overlay traffic tunnel that encrypts the overlay traffic, wherein the overlay traffic is opaque to preferred relay; and extending the overlay traffic tunnel to the target gateway over the second underlay network, wherein the target gateway is enabled to decrypt the overlay traffic and forward it to the target node.

11. The network computer of claim 8, further comprising:

establishing a first overlay traffic tunnel to the preferred relay, wherein the first overlay tunnel is terminated at the preferred relay, and wherein the overlay traffic is provided to the preferred relay over the overlay traffic tunnel;

establishing a second overlay traffic tunnel from the preferred relay to the target gateway; and employing the preferred relay to inspect the overlay traffic provided by the first overlay traffic tunnel before forwarding the overlay traffic to the second overlay traffic tunnel.

12. The network computer of claim 8, wherein ranking the two or more relays based on the one or more metrics associated with each relay, further comprises:

determining a relay selection model based on the overlay network; and determining a preference score for the two or more relays based on the relay selection model, wherein the relay selection model performs one or more actions for ranking the two or more relays, including one or more of, weighting the one or more metrics, or disqualifying one or more relays based on the one or more metric exceeding threshold value.

13. The network computer of claim 8, further comprising:

determining a value of the GID that is restricted to an upper bound value and a lower bound value, wherein the upper bound value and the lower bound value provide a namespace for a plurality of GIDs that are in the same overlay network, wherein one or more GIDs values that are outside of the upper bound value and the lower bound value are associated with one or more different overlay networks.

14. The network computer of claim 8, further comprising:

providing two or more agents that are hosted on the two or more relays; and collecting a portion of one or more metrics from the two or more agents, wherein the portion of the one or more metrics, include one or more of process count, memory load, number of users, number of active overlay traffic tunnels, or list of active applications.

15. A processor readable non-transitory storage media that includes instructions for managing communication over one or more networks, wherein execution of the instructions by the one or more network computers perform the method comprising:

determining a gateway identifier (GID), a network address, one or more source nodes, and two or more relays based on an overlay network, wherein the GID is based on the overlay network and the network address is based on a first underlay network;

determining a target GID of a target gateway in a second underlay network based on the overlay network;

ranking the two or more relays based on one or more metrics associated with each relay, wherein a top ranked relay is designated as a preferred relay; and in response to a source node providing overlay traffic directed to a target node associated with the target GID, performing further actions, including:

employing the first underlay network to provide network traffic that includes the overlay traffic to the preferred relay, wherein the preferred relay determines a target network address in the second underlay network based on the target GID, and wherein the preferred relay employs the target network address to provide the network traffic to the target gateway, and wherein the target gateway provides the overlay traffic to the target node;

determining one or more updated metrics associated with the two or more relays;

re-ranking the two or more relays based on the one or more updated metrics; and in response to another relay exceeding the rank of the preferred relay, designating the other relay as a new preferred relay, wherein the new preferred relay employs the second underlay network to provide the network traffic to the target gateway.

16. The media of claim 15, further comprising:

determining a relay evaluation model based on the overlay network; and determining one or more actions for determining the one or more metrics based on the relay evaluation model, wherein the one or more actions included one or more of pinging the two or more relays over the underlay network, measuring a latency value for the two or more relays, underlay network utilization of the one or more relays, processors load of the two or more relays, average number of underlay network connections to the two or more relays, average number of overlay traffic tunnels that are active in the two or more relays, or geographic distance to the two or more relays.

17. The media of claim 15, wherein employing the first underlay network to provide the network traffic that includes the overlay traffic to the preferred relay, further comprises:
establishing an overlay traffic tunnel that encrypts the overlay traffic, wherein the overlay traffic is opaque to preferred relay; and
extending the overlay traffic tunnel to the target gateway over the second underlay network, wherein the target gateway is enabled to decrypt the overlay traffic and forward it to the target node.

18. The media of claim 15, further comprising:
establishing a first overlay traffic tunnel to the preferred relay, wherein the first overlay tunnel is terminated at the preferred relay, and wherein the overlay traffic is provided to the preferred relay over the overlay traffic tunnel;
establishing a second overlay traffic tunnel from the preferred relay to the target gateway; and
employing the preferred relay to inspect the overlay traffic provided by the first overlay traffic tunnel before forwarding the overlay traffic to the second overlay traffic tunnel.

19. The media of claim 15, wherein ranking the two or more relays based on the one or more metrics associated with each relay, further comprises:
determining a relay selection model based on the overlay network; and
determining a preference score for the two or more relays based on the relay selection model, wherein the relay selection model performs one or more actions for ranking the two or more relays, including one or more of, weighting the one or more metrics, or disqualifying one or more relays based on the one or more metric exceeding threshold value.

20. The media of claim 15, further comprising:
determining a value of the GID that is restricted to an upper bound value and a lower bound value, wherein the upper bound value and the lower bound value provide a namespace for a plurality of GIDs that are in the same overlay network, wherein one or more GIDs values that are outside of the upper bound value and the lower bound value are associated with one or more different overlay networks.

21. The media of claim 15, further comprising:
providing two or more agents that are hosted on the two or more relays; and
collecting a portion of one or more metrics from the two or more agents, wherein the portion of the one or more metrics, include one or more of process count, memory load, number of users, number of active overlay traffic tunnels, or list of active applications.

22. A system for managing communication over one or more networks, comprising:
one or more gateway computers, comprising:
a memory that stores at least instructions; and
one or more processors that execute instructions that perform actions, including:
determining a gateway identifier (GID), a network address, one or more source nodes, and two or more relays based on an overlay network, wherein the GID is based on the overlay network and the network address is based on a first underlay network;
determining a target GID of a target gateway in a second underlay network based on the overlay network;
ranking the two or more relays based on one or more metrics associated with each relay, wherein a top ranked relay is designated as a preferred relay; and
in response to a source node providing overlay traffic directed to a target node associated with the target GID, performing further actions, including:
employing the first underlay network to provide network traffic that includes the overlay traffic to the preferred relay, wherein the preferred relay determines a target network address in the second underlay network based on the target GID, and wherein the preferred relay employs the target network address to provide the network traffic to the target gateway, and wherein the target gateway provides the overlay traffic to the target node;
determining one or more updated metrics associated with the two or more relays;
re-ranking the two or more relays based on the one or more updated metrics; and
in response to another relay exceeding the rank of the preferred relay,
designating the other relay as a new preferred relay, wherein the new preferred relay employs the second underlay network to provide the network traffic to the target gateway; and
one or more client computers, comprising:
a memory that stores at least instructions; and
one or more processors that execute instructions that perform actions, including:
providing the overlay traffic directed to the target node.

23. The system of claim 22, wherein the one or more gateway computer processors execute instructions that perform actions further comprising:
determining a relay evaluation model based on the overlay network; and
determining one or more actions for determining the one or more metrics based on the relay evaluation model, wherein the one or more actions included one or more of pinging the two or more relays over the underlay network, measuring a latency value for the two or more relays, underlay network utilization of the one or more relays, processors load of the two or more relays, average number of underlay network connections to the two or more relays, average number of overlay traffic tunnels that are active in the two or more relays, or geographic distance to the two or more relays.

24. The system of claim 22, wherein employing the first underlay network to provide the network traffic that includes the overlay traffic to the preferred relay, further comprises:
establishing an overlay traffic tunnel that encrypts the overlay traffic, wherein the overlay traffic is opaque to preferred relay; and
extending the overlay traffic tunnel to the target gateway over the second underlay network, wherein the target gateway is enabled to decrypt the overlay traffic and forward it to the target node.

25. The system of claim 22, wherein the one or more gateway computer processors execute instructions that perform actions further comprising:

establishing a first overlay traffic tunnel to the preferred relay, wherein the first overlay tunnel is terminated at the preferred relay, and wherein the overlay traffic is provided to the preferred relay over the overlay traffic tunnel;

establishing a second overlay traffic tunnel from the preferred relay to the target gateway; and employing the preferred relay to inspect the overlay traffic provided by the first overlay traffic tunnel before forwarding the overlay traffic to the second overlay traffic tunnel.

26. The system of claim 22, wherein ranking the two or more relays based on the one or more metrics associated with each relay, further comprises:

determining a relay selection model based on the overlay network; and determining a preference score for the two or more relays based on the relay selection model, wherein the relay selection model performs one or more actions for ranking the two or more relays, including one or more of, weighting the one or more metrics, or disqualifying one or more relays based on the one or more metric exceeding threshold value.

27. The system of claim 22, wherein the one or more gateway computer processors execute instructions that perform actions further comprising:

determining a value of the GID that is restricted to an upper bound value and a lower bound value, wherein the upper bound value and the lower bound value provide a namespace for a plurality of GIDs that are in the same overlay network, wherein one or more GIDs values that are outside of the upper bound value and the lower bound value are associated with one or more different overlay networks.

28. The system of claim 22, wherein the one or more gateway computer processors execute instructions that perform actions further comprising:

providing two or more agents that are hosted on the two or more relays; and collecting a portion of one or more metrics from the two or more agents, wherein the portion of the one or more metrics, include one or more of process count, memory load, number of users, number of active overlay traffic tunnels, or list of active applications.

\* \* \* \* \*